(12) United States Patent
Takeuchi

(10) Patent No.: US 10,425,469 B2
(45) Date of Patent: Sep. 24, 2019

(54) INFORMATION PROCESSING DEVICE, INFORMATION PROCESSING METHOD, AND INFORMATION PROCESSING SYSTEM

(71) Applicant: SONY CORPORATION, Tokyo (JP)

(72) Inventor: Yasuo Takeuchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 182 days.

(21) Appl. No.: 14/915,735

(22) PCT Filed: Sep. 2, 2014

(86) PCT No.: PCT/JP2014/073108
§ 371 (c)(1),
(2) Date: Mar. 1, 2016

(87) PCT Pub. No.: WO2015/053013
PCT Pub. Date: Apr. 16, 2015

(65) Prior Publication Data
US 2016/0301741 A1    Oct. 13, 2016

(30) Foreign Application Priority Data

Oct. 11, 2013    (JP) .................................. 2013-213687

(51) Int. Cl.
*H04L 29/08* (2006.01)
*G06K 19/07* (2006.01)
(Continued)

(52) U.S. Cl.
CPC .......... *H04L 67/10* (2013.01); *G06K 19/0727* (2013.01); *H04L 47/82* (2013.01);
(Continued)

(58) Field of Classification Search
CPC ...... H04L 67/10; H04L 47/82; H04M 1/7253; H04M 1/72522; H04M 2250/04;
(Continued)

(56) References Cited

U.S. PATENT DOCUMENTS

2009/0004969 A1* 1/2009 Luong .................. H04W 84/18
455/41.1
2010/0079261 A1    4/2010 Goto et al.
(Continued)

FOREIGN PATENT DOCUMENTS

CN    102511129 A    6/2012
JP    H11-282978 A    10/1999
(Continued)

OTHER PUBLICATIONS

Mar. 20, 2017, EP communication issued for related EP application No. 14852217.0.
(Continued)

*Primary Examiner* — Chris Parry
*Assistant Examiner* — Soe M Hlaing
(74) *Attorney, Agent, or Firm* — Paratus Law Group, PLLC

(57) ABSTRACT

There is provided an information processing device including a determination unit configured to determine one operation mode among a plurality of operation modes in which processing speeds are different when a process is performed, and a processing unit configured to transmit information regarding a processing time which is based on the determined operation mode and indicates a reference of the processing time when the process is performed to a communication control device capable of performing contactless communication with an external device using the information regarding the processing time for setting of a waiting time of the process.

14 Claims, 13 Drawing Sheets

(51) Int. Cl.
*H04L 12/911* (2013.01)
*H04W 8/18* (2009.01)
*H04M 1/725* (2006.01)
*H04W 4/80* (2018.01)

(52) U.S. Cl.
CPC ..... *H04M 1/7253* (2013.01); *H04M 1/72522* (2013.01); *G06K 19/07* (2013.01); *H04M 2250/04* (2013.01); *H04W 4/80* (2018.02); *H04W 8/183* (2013.01)

(58) Field of Classification Search
CPC ... G06K 19/0727; G06K 19/07; H04W 4/008; H04W 8/183
See application file for complete search history.

(56) References Cited

U.S. PATENT DOCUMENTS

| | | | | |
|---|---|---|---|---|
| 2012/0049942 | A1* | 3/2012 | Mori | G06K 19/0712 327/540 |
| 2012/0178367 | A1* | 7/2012 | Matsumoto | G06K 19/0707 455/41.1 |
| 2012/0309303 | A1* | 12/2012 | Hillan | H04B 5/0031 455/41.1 |

FOREIGN PATENT DOCUMENTS

| | | |
|---|---|---|
| JP | 2007-316716 A | 12/2007 |
| JP | 2008-515313 A | 5/2008 |
| JP | 2012-053540 A | 3/2012 |
| JP | 2012-190454 A | 10/2012 |
| JP | 2012-203474 A | 10/2012 |

OTHER PUBLICATIONS

Type 3 Tag Operation Specification, Technical Specification, NFC Forum, T3TOP 1.1, NFCForum_TS-Type-3-Tag_1.1, Jun. 28, 2011, pp. i-29.
May 8, 2018, Japanese Office Action issued for related JP Application No. 2015-541480.
May 16, 2018, Chinese Office Action issued for related CN Application No. 201480048770.1.

* cited by examiner

| Symbol | Minimum | Maximum | Unit | Class | Encoding (Binary) |
|---|---|---|---|---|---|
| Vcc | 4.5 | 5.5 | V | A | xx xxx1 |
| Vcc | 2.7 | 3.3 | V | B | xx xx1x |
| Vcc | 1.62 | 1.98 | V | C | xx x1xx |
| Vcc | RFU | RFU | V | D | xx 1xxx |
| Vcc | RFU | RFU | V | E | x1 xxxx |

NOTE: Class A, B and C values are according to ISO/IEC 7816-3 [11]. Class D is a further evolution of values specified in ISO/IEC 7816-3 [11]. It is possible to support a range of classes. The support shall be consecutive e.g. AB, BC. A combination like AC is not allowed.

B

| Symbol | Voltage Class | Maximum | Unit |
|---|---|---|---|
| Icc | A | 10 | mA |
| Icc | B | 7.5 | mA |
| Icc | C | 5 | mA |
| Icc | D | RFU | mA |
| Icc | E | RFU | mA |

FIG. 3

| Symbol | Conditions | Minimum | Maximum | Unit |
|---|---|---|---|---|
| Vcc | Class C | 1.62 | 1.98 | V |
| Icc | Class C | | 5 | mA |

NOTE: The current value is averaged over 1 ms.

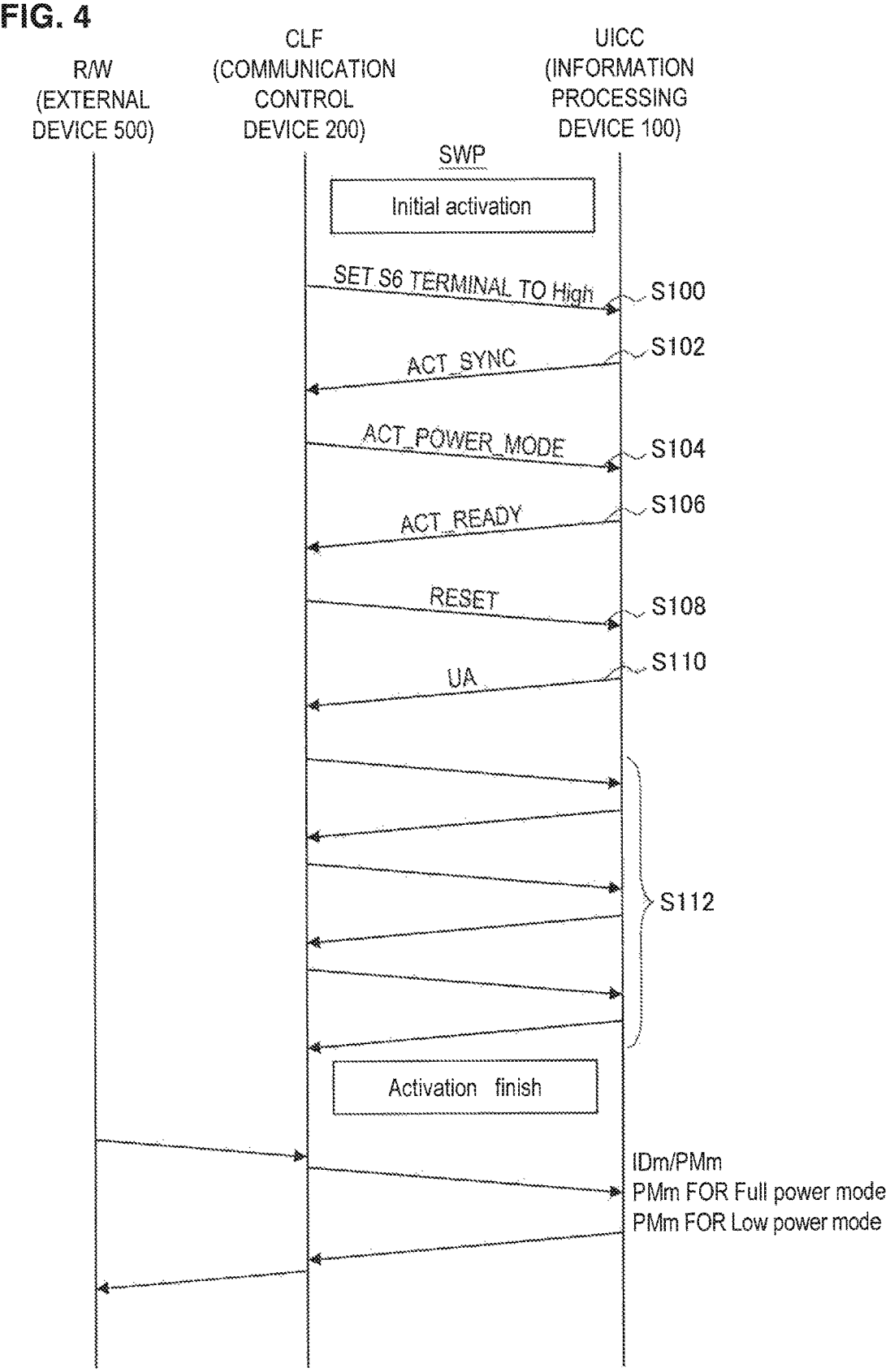

FIG. 5

| ACT_CTRL | Meaning | ACT_DATA FIELD |
|---|---|---|
| 000 | ACT_READY<br>Sent from UICC to CLF | 0 Byte |
| 010 | ACT_POWER_MODE<br>Sent from CLF to UICC to indicate the power mode for the UICC. | 1 Byte<br>'00': Low power mode } A<br>'01': Full power mode<br>(see Note) |
| 001 | ACT_SYNC<br>Sent from UICC to CLF to control the SYNC_ID verification process. | 2 Byte SYNC_ID |
| All other values<br>(see note) | | |
| NOTE: | All other values are reserved for future use. These values shall not be set by the transmitting entity and shall be ignored by the receiving entity. | |

FIG. 6

| | INFORMATION PROCESSING SYSTEM | OPERATION MODE BETWEEN CLF-UICC |
|---|---|---|
| A | POWER SOURCE ON/Battery | Full power mode |
| B | POWER SOURCE OFF/Battery | Low power mode |
| C | NO Battery | Power by the field(Low power mode) |

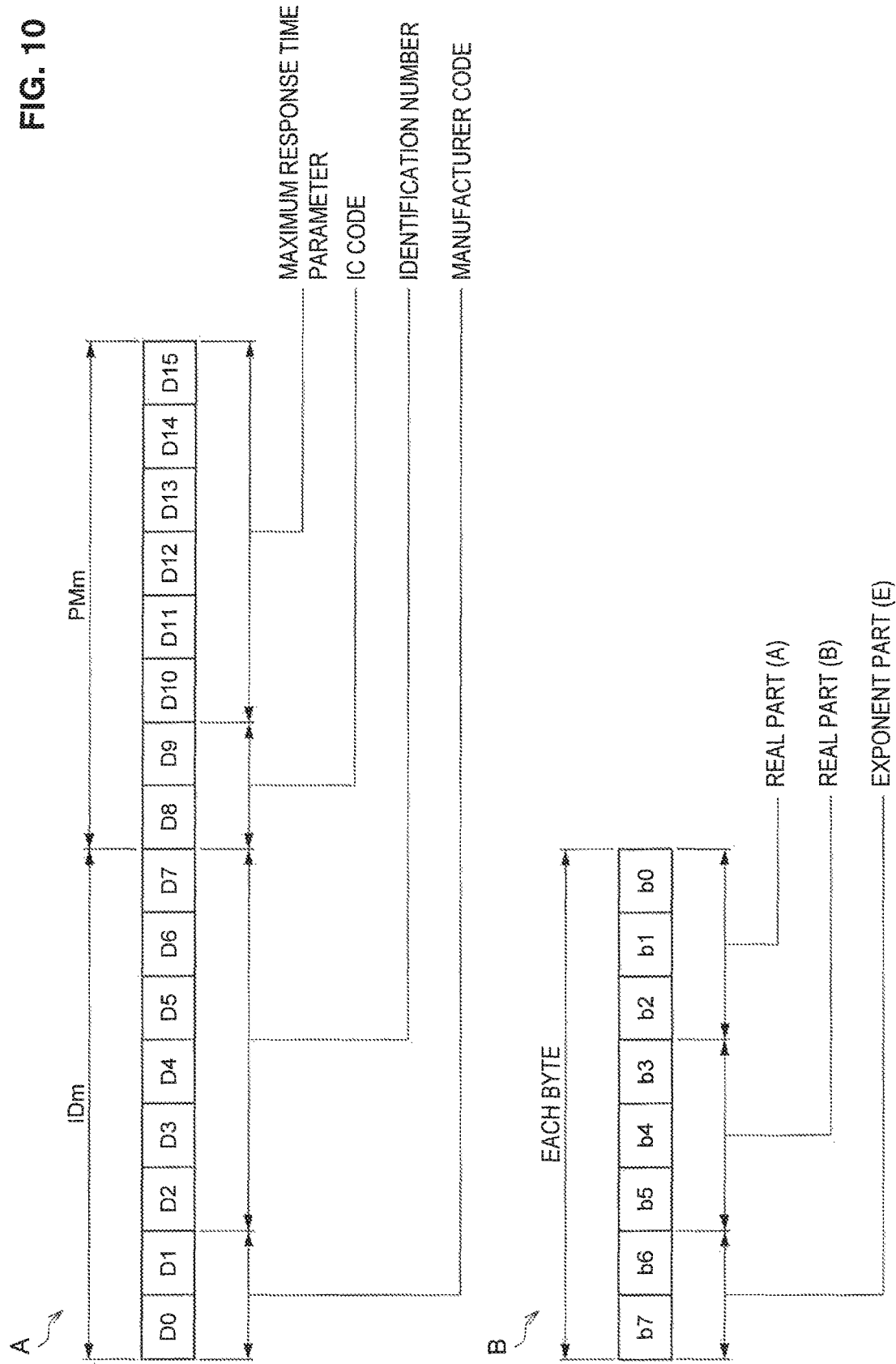

FIG. 11

| POSITION | COMMAND CLASSIFICATION | COMMAND NAME | MEANING OF n IN CALCULATION FORMULA |
|---|---|---|---|
| D10 | COMMANDS CHANGING RESPONSE TIME IN ACCORDANCE WITH PACKET ELEMENT | Request Service | NUMBER OF NODES |
| | | Request Service v2 | NUMBER OF NODES |
| D11 | COMMANDS NOT CHANGING RESPONSE TIME IN ACCORDANCE WITH PACKET ELEMENT | Request Response | 0 |
| | | Search Service Code | 0 |
| | | Request System Code | 0 |
| | | Get System Status | 0 |
| | | Request Specification Version | 0 |
| | | Reset Mode | 0 |
| | | Update Random ID | 0 |
| D12 | COMMANDS FOR MUTUAL AUTHENTICATION | Authentication 1 | NUMBER OF NODES |
| | | Authentication 2 | 0 |
| | | Authentication 1 v2 | NUMBER OF NODES |
| | | Authentication 2 v2 | 0 |
| D13 | COMMANDS FOR READING | Read Without Encryption | NUMBER OF BLOCKS |
| | | Read | NUMBER OF BLOCKS |
| | | Read v2 | NUMBER OF BLOCKS |
| D14 | COMMANDS FOR WRITING | Write Without Encryption | NUMBER OF BLOCKS |
| | | Write | NUMBER OF BLOCKS |
| | | Write v2 | NUMBER OF BLOCKS |
| D15 | OTHER COMMANDS | ISSUE COMMAND | 0 |

| COMMUNICATION CLASSIFICATION | PMm |
|---|---|
| 0 | PMm INDICATING 41.07 |
| 1 | PMm INDICATING 26.58 |
| 2 | PMm INDICATING 12.08 |
| 3 | PMm INDICATING 5.738 |
| 4 | PMm INDICATING 2.416 |

INFORMATION PROCESSING DEVICE, INFORMATION PROCESSING METHOD, AND INFORMATION PROCESSING SYSTEM

CROSS REFERENCE TO PRIOR APPLICATION

This application is a National Stage Patent Application of PCT International Patent Application No. PCT/JP2014/073108 (filed on Sep. 2, 2014) under 35 U.S.C. § 371, which claims priority to Japanese Patent Application No. 2013-213687 (filed on Oct. 11, 2013), which are all hereby incorporated by reference in their entirety.

TECHNICAL FIELD

The present disclosure relates to an information processing device, an information processing method, and an information processing system.

BACKGROUND ART

In recent years, devices (or systems), such as mobile phones on which contactless integrated circuit (IC) cards or contactless IC chips are mounted, capable of performing contactless communication with readers and writers (or devices with reader and writer functions; the same applies below) have become prevalent. For example, near field communication (NFC; hereinafter also referred to as "contactless communication" in some cases) in which communication is performed using a magnetic field (carrier waves) having a predetermined frequency such as 13.56 [MHz] between a reader and writer and a device (or a system) capable of performing contactless communication with the foregoing reader and writer is being used.

For the specifications of operating systems (OSs) mounted on ICs or NFC, for example, various specifications have been regulated by the industry associations such as Global Platform (GP). As the specification regulated by GP, for example, the specification disclosed in Non-Patent Literature 1 can be exemplified.

CITATION LIST

Non-Patent Literature

Non-Patent Literature 1: GlobalPlatform Card-Card Specification v2.2—Amendment C: Contactless Services v1.1

SUMMARY OF INVENTION

Technical Problem

Devices (or systems; hereinafter referred to as "information processing systems" in some cases) capable of performing contactless communication with external devices such as readers and writers include, for example, communication control devices such as antennas or contactless frontends (CLFs) or information processing devices such as subscriber identify modules (SIMs) or universal integrated circuit cards (UICCs).

In the case of contactless communication, for example, communication control devices included in information processing systems transmit information (for example, data including data indicating parameters called "PMm") delivered from information processing devices included in information processing systems to readers and writers via antennas in response to polling signals transmitted from the readers and writers. The readers and writers receiving the information transmitted in response to the polling signals from the information processing systems use the information to set waiting times (so-called timeout times) of processes. That is, for example, the information transmitted from the information processing systems in response to the polling signals as in PMm can be said to include information indicating references of processing times (data; hereinafter referred to as "information regarding the processing times") when the information processing devices included in the information processing systems perform processes. From the viewpoint of the information processing systems (or the respective devices included in the information processing systems), the readers and writers can be said to be external devices using the information regarding the processing times for the setting of the waiting times of the processes.

Here, preferably, the external devices such as the readers and writers flexibly set the waiting times of the processes.

It is desirable to provide a novel and improved information processing device, a novel and improved information processing method, and a novel and improved information processing system capable of causing an external device to flexibly set a waiting time.

Solution to Problem

According to the present disclosure, there is provided an information processing device including: a determination unit configured to determine one operation mode among a plurality of operation modes in which processing speeds are different when a process is performed; and a processing unit configured to transmit information regarding a processing time which is based on the determined operation mode and indicates a reference of the processing time when the process is performed to a communication control device capable of performing contactless communication with an external device using the information regarding the processing time for setting of a waiting time of the process.

According to the present disclosure, there is provided an information processing method performed by an information processing device, the information processing method including the steps of: determining one operation mode among a plurality of operation modes in which processing speeds are different when a process is performed; and transmitting information regarding a processing time which is based on the determined operation mode and indicates a reference of the processing time when the process is performed to a communication control device capable of performing contactless communication with an external device using the information regarding the processing time for setting of a waiting time of the process.

According to the present disclosure, there is provided an information processing system including: an information processing device; an antenna; a communication control device configured to be capable of performing communication with the information processing device and capable of performing contactless communication with an external device using information regarding a processing time indicating a reference of the processing time for setting of a waiting time of a process via the antenna; and a processing device configured to be capable of performing a process in conjunction with the information processing device through communication. The information processing device includes a determination unit that determines one operation mode among a plurality of operation modes in which processing speeds are different when the process is performed, and a processing unit that transmits information regarding the processing time which is based on the determined operation mode to the communication control device.

Advantageous Effects of Invention

According to an embodiment of the present disclosure, it is possible to cause an external device to flexibly set a waiting time of a process.

In addition, the effects described in the present specification are merely illustrative and demonstrative, and not limitative. In other words, the technology according to the present disclosure can exhibit other effects that are evident to those skilled in the art along with or instead of the effects based on the present specification.

BRIEF DESCRIPTION OF DRAWINGS

FIG. 2 is an explanatory diagram illustrating an example of a process related to an information processing method according to the embodiment.

FIG. 3 is an explanatory diagram illustrating an example of a process related to an information processing method according to the embodiment.

FIG. 4 is an explanatory diagram illustrating an example of a process related to an information processing method according to the embodiment.

FIG. 5 is an explanatory diagram illustrating an example of a process related to an information processing method according to the embodiment.

FIG. 6 is an explanatory diagram illustrating an example of a process related to an information processing method according to the embodiment.

FIG. 10 is an explanatory diagram illustrating an example of a process related to an information processing method according to the embodiment.

FIG. 11 is an explanatory diagram illustrating an example of a process related to an information processing method according to the embodiment.

DESCRIPTION OF EMBODIMENTS

Hereinafter, preferred embodiments of the present disclosure will be described in detail with reference to the appended drawings. In this specification and the drawings, elements that have substantially the same function and structure are denoted with the same reference signs, and repeated explanation is omitted.

Hereinafter, the description will be described in the following order.

1. Information processing method according to embodiment

2. Information processing device according to embodiment

3. Program according to embodiment (Information Processing Method According to Embodiment)

First, an information processing method according to the embodiment will be described. Hereinafter, for example, the information processing method according to the embodiment when a process related to the information processing method according to the embodiment is performed by an information processing device according to the embodiment included in an information processing system according to the embodiment will be described.

Figure 1:
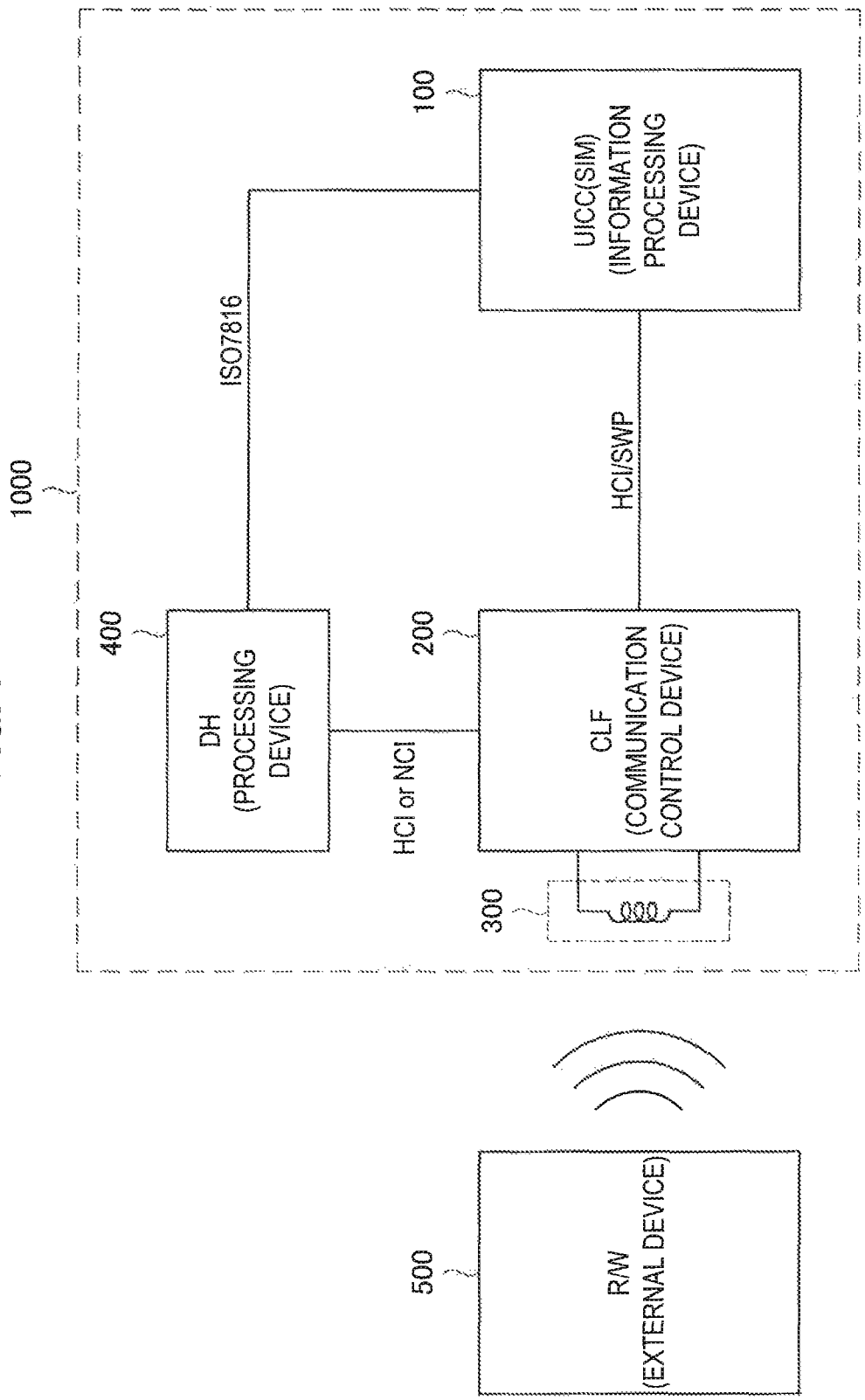
FIG. 1 is an explanatory diagram illustrating an example of the configuration of an information processing system according to an embodiment.

[1] Example of Configuration of Information Processing System According to Embodiment An example of the configuration of the information processing system according to the embodiment will be described as a premise of the description of the information processing method according to the embodiment. FIG. 1 is an explanatory diagram illustrating an example of the configuration of an information processing system 1000 according to an embodiment. In FIG. 1, an external device 500 using information (to be described below) regarding a processing time according to the embodiment for setting of a waiting time of a process is also illustrated. In FIG. 1, a reader and writer (hereinafter referred to as an R/W in some cases) is illustrated as an example of the external device 500.

The information processing system 1000 includes, for example, an information processing device 100, a communication control device 200, an antenna 300, and a processing device 400.

In FIG. 1, a UICC (or SIM) is illustrated as an example of the information processing device 100 and a CLF is illustrated as an example of the communication control device 200. In FIG. 1, a device host (DH) is illustrated as an example of the processing device 400.

FIG. 1 illustrates an example in which the information processing device 100 and the communication control device 200 perform communication via communication interfaces such as a host controller interface (HCI) and a single wire protocol (SWP). FIG. 1 also illustrates an example in which the information processing device 100 and the processing device 400 perform communication via a communication interface based on the ISO7816 standard. FIG. 1 also illustrates an example in which the communication control device 200 and the processing device 400 perform communication via an HCI or an NFC controller interface (NCI). The communication interfaces for performing the communication between the devices included in the information processing system 1000 are not limited to the examples illustrated in FIG. 1. For example, the devices included in the information processing system 1000 may perform communication via any communication interface or protocol enabling the devices to perform the communication.

[1-1] Overview of Information Processing Device 100

The information processing device 100 serves to perform a process related to the information processing method according to the embodiment to be described below and transmits the information regarding the processing time to the communication control device 200. The information processing device 100 causes a communication interface included in the information processing device 100 or an external communication interface connected to the information processing device 100 to transmit the information regarding the processing time to the communication control device 200.

Here, the information regarding the processing time according to the embodiment is data that indicates a reference of the processing time when a process is performed. As the information regarding the processing time according to the embodiment, for example, data indicating a parameter called "PMm" can be exemplified. The information regarding the processing time according to the embodiment is not limited to PMm, but may be, for example, any data which can be used for a process related to the setting of the waiting time in the external device 500. Hereinafter, a case in which the information regarding the processing time according to the embodiment is PMm will be described.

For example, the information processing device 100 performs processes based on various signals transmitted from the external device 500 when the various signals transmitted from the external device 500 are received from the communication control device 200. Then, the information processing device 100 transmits response signals according to processing results to the communication control device 200.

[1-2] Overview of Communication Control Device 200

The communication control device 200 performs contactless communication with the external device 500 using the information regarding the processing time according to the embodiment for the setting of the waiting time of the process. For example, the communication control device 200 performs the contactless communication with the external device 500 by receiving a signal transmitted from the external device 500 via the connected antenna 300, performing load modulation, and transmitting a signal via the antenna 300. As the antenna 300, for example, an inductor having predetermined inductance can be exemplified.

In FIG. 1, the example in which the communication control device 200 performs the contactless communication with the external device 500 via the connected antenna 300 is illustrated. However, the communication control device 200 may include the antenna 300.

[1-3] Overview of Processing Device 400

The processing device 400 includes a processor that includes a micro processing unit (MPU) or various processing circuits and performs various processes. As the processes performed by the processing device 400, for example, a process in in conjunction with the information processing device 100 through communication, a process related to the communication with the communication control device 200, and a process that the processing device 400 performs by itself can be exemplified.

The information processing system 1000 has, for example, the configuration illustrated in FIG. 1.

The configuration of the information processing system according to the embodiment is not limited to the example illustrated in FIG. 1.

For example, the information processing system according to the embodiment may not include the processing device 400.

The information processing system according to the embodiment may be, for example, a device in which the communication control device 200 and the processing device 400 illustrated in FIG. 1 are integrated.

The information processing system according to the embodiment may be, for example, a device in which the information processing device 100, the communication control device 200, and the antenna 300 illustrated in FIG. 1 are integrated. When the information processing system is the device in which the information processing device 100, the communication control device 200, and the antenna 300 are integrated, the integrated device is referred to as, for example, a "microSD" in some cases.

For example, the information processing system according to the embodiment may have a configuration in which the information processing device 100 illustrated in FIG. 1 is internally included in the processing device 400. When the information processing device 100 is configured to be internally included in the processing device 400, the information processing device 100 is referred to as, for example, a "TEE" in some cases.

For example, the information processing system according to the embodiment may have a configuration in which the information processing device 100, the communication control device 200, and the processing device 400 illustrated in FIG. 1 are integrated, that is, may have a configuration in which the information processing system according to the embodiment is a single device.

When the information processing system according to the embodiment has, for example, any of the several configurations described above, the information processing device 100 (or a device corresponding to the information processing device 100) included in the information processing system according to the embodiment can perform a process related to the information processing method according to the embodiment to be described below. Accordingly, when the information processing system according to the embodiment has, for example, any of the several configurations described above, an external device can be caused to set the waiting time of the process flexibly.

In the information processing system according to the embodiment, the information processing device 100 can also be detachably mounted. When the information processing device 100 can be detachably mounted, the information processing device 100 is referred to as, for example, a "UICC" in some cases. When the information processing device 100 may not be detachably mounted, the information processing device 100 is referred to as, for example, an "eUICC" in some cases. For example, when the information processing system according to the embodiment is a communication device such as a mobile phone and the information processing device 100 does not store information necessary for connection with a general public wireless line, the information processing device 100 is referred to as, for example, an "eSE" in some cases. When the information processing device 100 can be detachably mounted, the information processing device 100 can perform the process related to the information processing method according to the embodiment to be described below, for example, in the information processing system according to any embodiment on which the information processing device 100 is mounted. In more detail, when the information processing device 100 is combined with the communication control device 200 according to any kind of embodiment, the information processing device 100 can perform the process related to the information processing method according to the embodiment to be described below. Accordingly, even when the information processing device 100 can be detachably mounted, the external device can be caused to flexibly set the waiting time of the process.

[2] Process Related to Information Processing Method According to Embodiment

Next, the process related to the information processing method according to the embodiment will be described. Hereinafter, a case in which the information processing device 100 according to the embodiment included in the information processing system 1000 illustrated in FIG. 1 performs the process related to the information processing method according to the embodiment will be exemplified. Hereinafter, the information processing device 100 is referred to as a "UICC," the communication control device 200 is referred to as a "CLF," and the external device 500 is referred to as an "R/W" in some cases. As described above, the information processing device 100 is not limited to the "UICC." The communication control device 200 and the external device 500 are not limited to the "CLF" and "R/W" either.

A processing time necessary for the information processing device 100 to perform a certain process is not limited to a constant time, but can be changed according to, for example, an operation state of the information processing device. As described above, when the processing time necessary for the information processing device 100 to perform the process is changed, there is a concern of a difference increasing between the processing time necessary for the information processing device 100 to perform the process and a reference of the processing time indicated by the information regarding the processing time used to set the waiting time by the external device 500.

When the difference increases between the processing time necessary for the information processing device 100 to perform the process and the reference of the processing time indicated by the information regarding the processing time, the following situation occurs in accordance with the waiting time of the process set based on the information regarding the processing time by the external device, and thus there is a concern of smooth communication between the external device 500 and the information processing system 1000 being obstructed.

When communication may not be established during communication between the external device 500 and the information processing system 1000, it takes an excessive amount of time until timeout, and thus retry of the communication or subsequent transaction may not be performed smoothly.

Accordingly, for example, the information processing device 100 supplies the information regarding the processing time corresponding to the processing time necessary for the information processing device 100 to perform the process to the external device 500 using the information regarding the processing time for the setting of the waiting time of the process, for example, by performing (1) a determination process and (2) a transmission control process to be described below. When the information regarding the processing time is supplied to the external device 500, the external device 500 can set the waiting time of the process corresponding to the processing time necessary for the information processing device 100 to perform the process based on the information regarding the processing time. Accordingly, the information processing device 100 can cause the external device 500 to flexibly set the waiting time of the process, for example, when the information processing device 100 performs (1) the determination process and (2) the transmission control process to be described below.

(1) Determination Process

For example, the information processing device 100 determines one operation mode among a plurality of operation modes in which processing speeds are different when performing the process.

(1-1) First Example of Determination Process

The information processing device 100 determines an operation mode based on information indicating the operation mode and acquired from the communication control device 200.

More specifically, in the information processing system 1000, for example, negotiation related to power supply is performed between the communication control device 200 and the information processing device 100. As the result of the negotiation related to the power supply, the information processing device 100 acquires the information indicating the operation mode from the communication control device 200. By determining the operation mode based on the information indicating the operation mode from the communication control device 200, the processing speed when the information processing device 100 performs the process can be changed based on the result of the negotiation related to the power supply. Here, the negotiation related to the power supply between the communication control device 200 and the information processing device 100 according to the embodiment is, for example, exchange of the information indicating the operation mode or information indicating various parameters. In the negotiation related to the power supply between the communication control device 200 and the information processing device 100 according to the embodiment, for example, execution of settings related to the power supply based on the various pieces of exchanged information may be included.

For example, when the information processing system 1000 is a system based on the specifications regulated by the European Telecommunication Standards Institute (ETSI), two operation modes, a "full power mode" and a "low power mode" (which is an operation mode in which power (voltage×current) to be used is lower than the "full power mode" and is an operation mode in which a processing performance is consequently lower) regulated in, for example, the ETSI specification, "ETSI TS 102.613—Smart Cards; UICC-Contactless Front-end (CLF) Interface; —Part 1: Physical and data link layer characteristics" are present in the information processing device 100.

Hereinafter, a case in which the operation modes determined by the information processing device 100 are two operation modes, the "full power mode" and the "low power mode," will be mainly exemplified. The operation modes according to the embodiment are not limited to the "full power mode" and the "low power mode." The information processing device 100 can determine one operation mode among the plurality of operation modes in which the processing speeds are different in the determination process according to the embodiment.

FIGS. 2 and 3 are explanatory diagrams illustrating an example of the process related to the information processing method according to the embodiment. FIG. 2 illustrates content of the "full power mode" regulated in "ETSI TS 102.221. Here, the "full power mode" is, for example, an operation mode corresponding to a voltage and current state when the information processing device 100 performs an operation at normal times. FIG. 3 illustrates content of the "low power mode" regulated in "ETSI TS 102.613." Here, the "low power mode" is, for example, an operation mode when the operation is performed at minimum Class C.

Based on the result of the negotiation related to the power supply between the information processing device 100 and the communication control device 200, the information processing device 100 determines one operation mode in which the own device (the information processing device 100) operates between the two operation modes, "the full power mode" and the "low power mode," for example. As the determination result of the operation mode, the processing speed when the information processing device 100 performs the process is decided according to the determined operation mode.

FIGS. 4 and 5 are explanatory diagrams illustrating an example of the process related to the information processing method according to the embodiment. FIG. 4 illustrates an example of a case in which the information processing device 100 acquires the information indicating the operation mode in "Initial activation" of SWP performed between the communication control device 200 and the information processing device 100. FIG. 5 illustrates content regulated in "ETSI TS 102.613" and A illustrated in FIG. 5 corresponds to an example of content indicated by the information indicating the operation mode according to the embodiment.

When "Initial activation" of SWP starts, the communication control device 200 sets a signal level of an S6 terminal among terminals related to the communication with the information processing device 100 to a high level (S100). When the signal level of the S6 terminal is high, the information processing device 100 responds (S102).

The communication control device 200 receiving the response from the information processing device 100 in step 102 transmits the information indicating the operation mode to the information processing device 100 (S104). Here, as the information indicating the operation mode according to the embodiment, for example, "00" (data corresponding to the low power mode) and "01" (data corresponding to the full power mode) illustrated in A of FIG. 5 can be exemplified.

The information processing device 100 receiving the information indicating the operation mode transmitted from the communication control device 200 in step 104 performs a determination process according to a first example to determine the operation mode. For example, when the information indicating the operation mode according to the embodiment is "00" illustrated in A of FIG. 5, the information processing device 100 determines that the operation mode is the "low power mode." When the information indicating the operation mode according to the embodiment is "01" illustrated in A of FIG. 5, the information processing device 100 determines that the operation mode is the "full power mode." Then, the information processing device 100 responds (S106).

The communication control device 200 receiving the response from the information processing device 100 in step 106 transmits a signal including a reset command to the information processing device 100 (S108). The information processing device 100 receiving the signal including the reset command transmitted from the communication control device 200 in step 108 performs a process according to the received signal and responds (S110).

When the process of step S100 to the process of step S110 are performed, various parameters are exchanged (S112) between the communication control device 200 and the information processing device 100 and "Initial activation" of SWP is completed. When "Initial activation" of SWP is completed, the information processing device 100 performs, for example, a process according to a signal (for example, a polling signal) transmitted from the external device 500 and responds.

The information processing device 100 acquires the information indicating the operation mode from the communication control device 200 through, for example, the process illustrated in FIG. 4 and determines the operation mode based on the acquired information indicating the operation mode. It is needless to say that the process when the information processing device 100 acquires the information indicating the operation mode from the communication control device 200 is not limited to the example illustrated in FIG. 4.

(1-2) Second Example of Determination Process

The determination process according to the embodiment is not limited to the process according to the foregoing first example. For example, the information processing device 100 can also determine the operation mode based on presence or absence of a power source or based on presence or absence of a power source and a state of the power source. The determination of the operation mode based on the state of the power source is performed, for example, when a power source is present.

Here, the power source according to the embodiment is, for example, a power source supplying power to the information processing device 100 or the communication control device 200 (or further the processing device 400) included in the information processing system 1000. As the power source according to the embodiment, for example, a battery included in the information processing system 1000, an external battery connected to the information processing system 1000, or a commercial power source can be exemplified.

More specifically, for example, when the power source is absent or the power source is present and the state of the power source is an OFF state, the information processing device 100 determines that the operation mode is the operation mode set in advance to correspond to each case. For example, when the power source is present and the state of the power source is an ON state, the information processing device 100 determines the operation mode based on the information indicating the operation mode acquired from the communication control device 200 as in the determination process according to the foregoing first example.

FIG. 6 is an explanatory diagram illustrating an example of the process related to the information processing method according to the embodiment. FIG. 6 illustrates an example of the operation mode determined in the determination process according to a second example in the form of a table. In FIG. 6, the power source is indicated as "Battery," the ON state of the power source is indicated as "power source ON," and the OFF state of the power source is indicated as "power source OFF."

For example, as illustrated in FIG. 6, when the power source is present and the state of the power source is the ON state (for example, as illustrated in A of FIG. 6), the operation processing device 100 determines that the operation mode is the "full power mode." When the power source is present and the state of the power source is the OFF state (as illustrated in B of FIG. 6), the information processing device 100 determines that the operation mode is the "low power mode." When there is no power source (for example, as illustrated in B of FIG. 6), the information processing device 100 determines that the operation mode is the "low power mode." Here, "Power by the field" indicated in C of FIG. 6 refers to an operation mode in which power obtained from a magnetic field of a predetermined frequency such as 13.56 [MHz] transmitted from the external device 500 or the like is used for driving.

It is needless to say that the example of the operation mode determined in the determination process according to the second example is not limited to the example illustrated in FIG. 6.

The information processing device 100 performs, for example, the determination process according to the foregoing first example or the determination process according to the foregoing second example as the determination process according to the embodiment.

The two operation modes, the "full power mode" and the "low power mode," regulated in ETSI have been exemplified above as the operation modes according to the embodiment. However, as described above, the operation modes according to the embodiment are not limited to the foregoing operation modes and are not limited to two operation modes either. For example, the information processing device 100 may determine one operation mode among the plurality of operation modes in which the processing speeds are different. For example, the information processing device 100 can also determine the operation mode based on the parameters regulated in "VERSION SW" or the like defined with "Identify management gate" regulated in, for example, in ETSI TS 102.622.

(2) Transmission Control Process

The information processing device 100 transmits the information regarding the processing time based on the operation mode determined in the process (the determination process) of the foregoing (1) to the communication control device 200 capable of performing the contactless communication with the external device 500 using the information regarding the processing time for the setting of the waiting time of the process.

Here, for example, the information processing device 100 transmits one piece of information regarding the processing time selected among the pieces of information regarding the plurality of processing times to the communication control device 200. For example, the information processing device 100 selects the information regarding the processing time indicating a value decided in the example of the transmission control process according to the embodiment to be described below (or a value closer to the decided value) among the pieces of information regarding the plurality of processing times.

For example, the information processing device 100 selects one piece of information regarding the processing time from the plurality of pieces of information regarding the processing time stored in one or two or more of the recording media such as a recording medium included in the information processing device 100, an external recording medium connected to the information processing device 100, and the like. Hereinafter, the recording medium included in the information processing device 100, the external recording medium connected to the information processing device 100, and the like are collectively referred to as "recording media" in some cases.

For example, the information processing device 100 may adjust a value indicated by one piece of information regarding the processing time and transmit the information regarding the processing time indicating the adjusted value to the communication control device 200. For example, the information processing device 100 adjusts the value indicated by one piece of information regarding the processing time stored in the recording medium to a value decided in an example of the transmission control process according to the embodiment to be described below.

The communication control device 200 receiving the information regarding the processing time transmitted in the transmission control process according to the embodiment transmits the information regarding the processing time to the external device 500 through contactless communication. Then, the external device 500 receiving the information regarding the processing time uses the received information regarding the processing time for the setting of the waiting time of the process.

An example of a series of processes in the external device 500 and the information processing system 1000 will be described before specific description of the transmission control process according to the embodiment in the information processing device 100.

Figure 7:
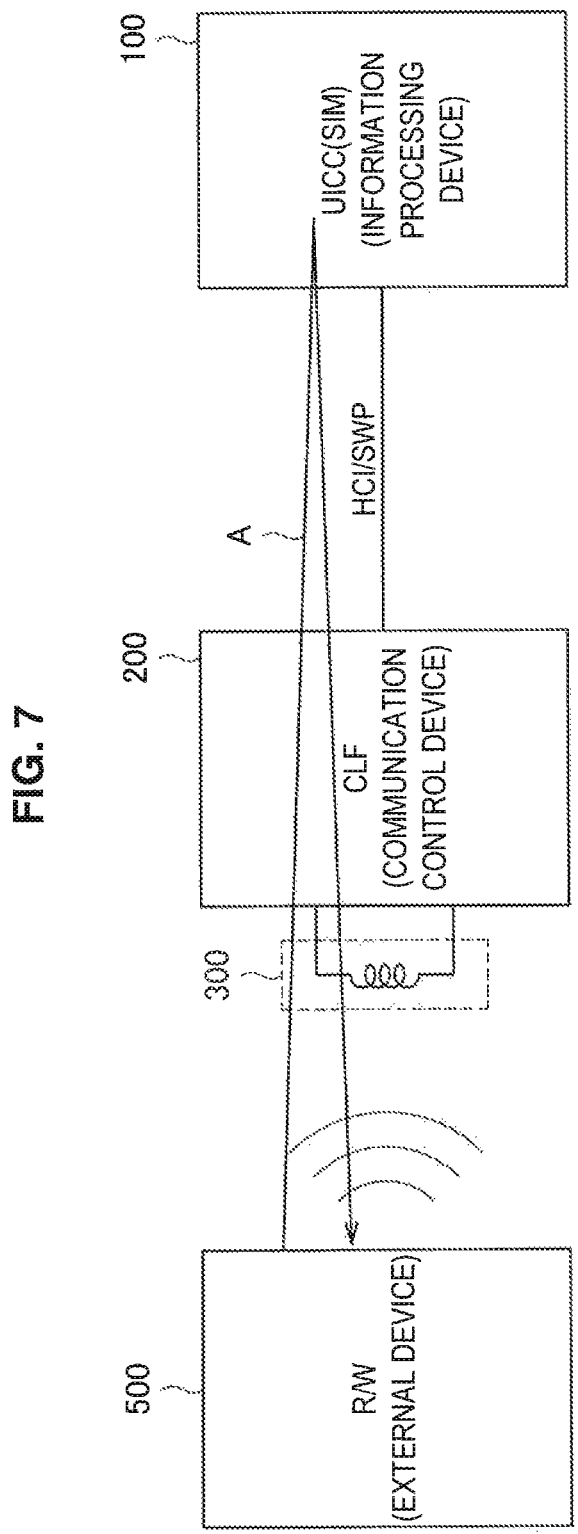
FIG. 7 is an explanatory diagram illustrating an example of a process related to an information processing method according to the embodiment.

FIG. 7 is an explanatory diagram illustrating an example of the process related to the information processing method according to the embodiment. FIG. 7 illustrates the flow of communication in the series of processes in the external device 500 and the information processing system 1000 (A illustrated in FIG. 7).

The external device 500 transmits a polling signal including a polling command through the contactless communication. For example, the communication control device 200 receiving the polling signal transmitted from the external device 500 via the antenna 300 converts the received polling signal (analog signal) into a digital signal and transmits the polling signal (a data string including the polling command; hereinafter referred to as "polling data" in some cases) converted into the digital signal to the information processing device 100. Here, for example, the foregoing process related to the polling signal is regulated in the specification by ETSI. For example, the communication control device 200 may convert the received polling signal (analog signal) into a digital signal and further convert the digital signal into data with a format corresponding to SWP.

For example, as illustrated in FIG. 4, connection between the communication control device 200 and the information processing device 100 starts in "Initial activation" of SWP and the connection is established.

Here, the connection between the communication control device 200 and the information processing device 100 may be performed, for example, when the power source is present and the power source is turned on. For example, when the power source is included and the power source is turned on and when the connection between the communication control device 200 and the information processing device 100 is performed, the communication control device 200 transmits the information indicating the operation mode indicting the "full power mode" to the information processing device 100.

Hereinafter, an example of a series of processes in the external device 500 and the information processing system 1000 will be described exemplifying a case in which the information processing device 100 acquires the information indicating the operation mode indicating the "full power mode" from the communication control device 200, that is, determines that the operation mode is the "full power mode."

The information processing device 100 receiving the polling data transmits a polling response to the communication control device 200 based on content of a parameter indicated by the polling command included in the polling data. Here, for example, the information processing device 100 transmits the polling response including the information regarding the processing time according to the embodiment to the communication control device 200.

Figure 8:
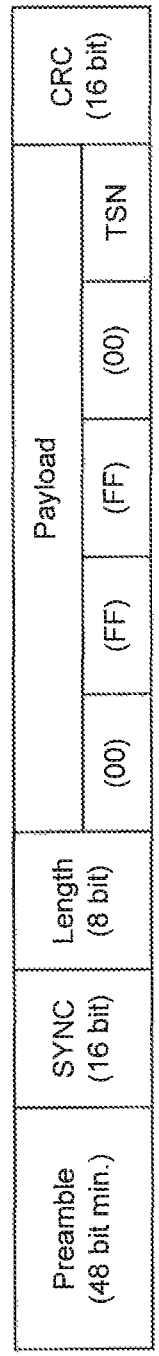
FIG. 8 is an explanatory diagram illustrating an example of a process related to an information processing method according to the embodiment.
Figure 9:
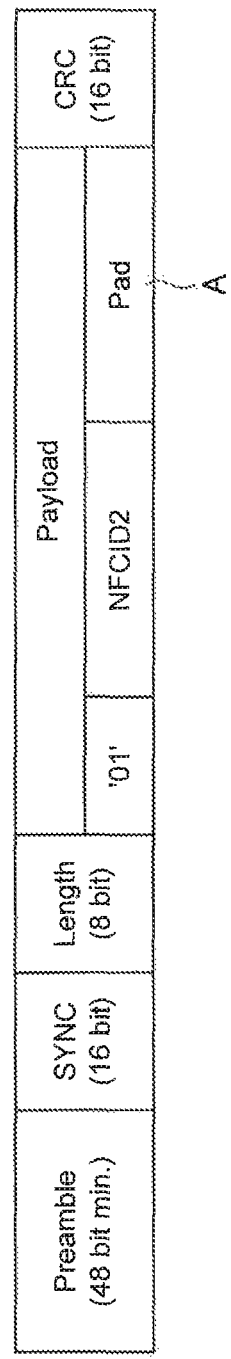
FIG. 9 is an explanatory diagram illustrating an example of a process related to an information processing method according to the embodiment.

FIGS. 8 and 9 are explanatory diagrams illustrating an example of the process related to the information processing method according to the embodiment. FIG. 8 illustrates an example of the polling response received by the information processing device 100. FIG. 8 illustrates the polling signal regulated in "ISO18092." The polling signal includes the polling command. FIG. 9 illustrates an example of the signal format of a response to the polling signal. FIG. 9 illustrates the format of the response to the polling signal regulated in "ISO18092."

Here, when a certain polling response is transmitted with the format of the polling response illustrated in FIG. 9, "Pad" illustrated in A of FIG. 9 represents PMm (which is an example of the information regarding the processing time according to the embodiment). Accordingly, the information processing device 100 can transmit the polling response including the information regarding the processing time according to the embodiment to the communication control device 200 by transmitting the certain polling response with the format of the polling response illustrated in FIG. 9.

The format of the polling response according to the embodiment or the polling response is not limited to the format or the polling response regulated in "ISO18092." For example, the polling response according to the embodiment may have any format which can include the information regarding the processing time. For example, the polling response according to the embodiment may not include the information regarding the processing time, and the information regarding the processing time according to the embodiment may be different data from the polling response.

Hereinafter, an example of a series of processes in the external device 500 and the information processing system 1000 will be described exemplifying a case in which the information regarding the processing time according to the embodiment is included in the polling response.

The communication control device 200 receiving the polling response including the information regarding the processing time and transmitted from the information processing device 100 transmits the polling response including the information regarding the processing time to the external device 500 via the antenna 300.

The external device 500 receiving the polling response including the information regarding the processing time extracts the information regarding the processing time from the polling response.

FIGS. 10 and 11 are explanatory diagrams illustrating an example of the process related to the information processing method according to the embodiment. A of FIG. 10 illustrates an example of content indicated by the information regarding the processing time according to the embodiment. For example, as illustrated in A of FIG. 10, PMm includes a maximum response time parameter indicating a maximum response time. Accordingly, PMm illustrated in A of FIG. 10 corresponds to the information regarding the processing time according to the embodiment. B of FIG. 10 illustrates an example of content indicated by each byte of the information regarding the processing time according to the embodiment. FIG. 11 illustrates an example of content (content of the maximum response time parameter) of D10 to D15 illustrated in A of FIG. 10. Here, FIGS. 10 and 11 illustrate content regulated in a FeliCa (registered trademark) Card User's Manual Excerpted Edition version 2.0 (http://www.sony.co.jp/Products/felica/business/techsupport/data/card_usersmanual_2.0.pdf).

The external device 500 extracting the information regarding the processing time from the polling response performs calculation indicated by, for example, the following formula 1 to calculate the waiting time (timeout time) of the process. Then, the external device 500 sets the calculated waiting time of the process.

Here, 'T' in formula 1 is expressed in, for example, the following formula 2. When the value of "fc" is 13.56 [MHz], the value of T is about 0.3020 [msec]. Further, "A" in formula 1 indicates a real part (A) illustrated in B of FIG. 10, "B" in formula 1 indicates a real part (B) illustrated in B of FIG. 10, and "E" in formula 1 indicates an exponent part (E) illustrated in B of FIG. 10. Further, "n" in formula 1 indicates, for example, the number of services searched for in a request service command (which is an example of a command transmitted from the external device 500).

$$\text{Waiting time of process} = T \times \{B+1) \times n + (A+1)\} \times 4^E \quad \text{(formula 1)}$$

$$T = 256 \times 16/fc \quad \text{(formula 2)}$$

As a specific example, when the value "3B" is entered to D10 illustrated in A of FIG. 10 in the information regarding the processing time corresponding to the "full power mode" and the number of services searched for in the request service command is "4," the external device 500 sets 10.872 [msec]$(0.302 \times \{(7+1) \times 4 + (3+1)\} \times 4^0)$ calculated with the foregoing formula 1 as the waiting time of the process.

Further, when the value "59" is entered into D10 illustrated in A of FIG. 10 in the information regarding the processing time corresponding to the "low power mode" and the number of services searched for in the request service command is "4," the external device 500 sets 21.744 [msec] $(0.302 \times \{(3+1) \times 4 + (1+1)\} \times 4^1)$ calculated with the foregoing formula 1 as the waiting time of the process. That is, when the information regarding the processing time corresponding to the "low power mode" is used, the external device 500 sets the waiting time of the process which is twice the waiting time of the process when the information regarding the processing time corresponding to the "full power mode" is used.

As described above, the external device 500 sets the waiting time of the process corresponding to the information regarding the processing time.

Accordingly, the information processing device 100 transmits the information regarding the processing time based on the operation mode determined in the process (the determination process) of the foregoing (1) in the transmission control process according to the embodiment to the communication control device 200, for example, so that external device 500 can set the waiting time of the process corresponding to the operation mode of the information processing device 100. The information processing device 100 performs the transmission control process according to the embodiment, so that the external device 500 can set the more proper waiting time (the timeout time) of the process. Therefore, it is possible to prevent the occurrence of the situation in which the smooth communication between the external device 500 and the information processing system 1000, as described above, is obstructed.

The process related to the setting of the waiting time of the process in the external device 500 according to the embodiment is not limited to the process using formula 1. For example, when no response is returned from the information processing system 1000, the external device 500 can also flexibly adjust the waiting time of the process for each of the transmitted commands.

Next, examples of the transmission control process according to the embodiment will be described more specifically.

(2-1) First Example of Transmission Control Process

The information processing device 100 transmits the information regarding the processing time based on the operation mode determined in the process (the determination process) of the foregoing (1) to the communication control device 200. For example, the information processing device 100 determines a value corresponding to the operation mode determined in the process (the determination process) of the foregoing (1) and transmits the information regarding the processing time indicating the decided value to the communication control device 200.

Here, for example, the information processing device 100 decides the value corresponding to the operation mode determined in the process (the determination process) of the foregoing (1) based on a table (or a database) in which the operation mode and the value corresponding to the operation mode are associated and the operation mode determined in the process (the determination process) of the foregoing (1). For example, the information processing device 100 uses the table (or the database) in which the operation mode and the value corresponding to the operation mode are associated and which is stored in a recording medium such as a recording medium included in the information processing device 100.

The method of deciding the value corresponding to the operation mode determined in the process (the determination process) of the foregoing (1) according to the embodiment in the transmission control process according to the first example is not limited to the foregoing method. For example, the information processing device 100 can also calculate a value corresponding to the waiting time of the process caused to be set by the external device 500 using the foregoing formula 1 and decide the calculated value as the value corresponding to the operation mode determined in the process (the determination process) of the foregoing (1).

For example, when the operation mode determined in the process (the determination process) of the foregoing (1) is the "full power mode" and the waiting time of the process such as "10.872 [msec]" is caused to be set by the external device 500, the information processing device 100 decides the value "3B" using the foregoing formula 1. For example, the information processing device 100 specifies the waiting time of the process corresponding to the operation mode determined in the process (the determination process) of the foregoing (1) using a table (or a database) in which the operation mode is associated with the waiting time of the process and which is recorded in a recording medium such as the recording medium included in the information processing device 100.

For example, when the operation mode determined in the process (the determination process) of the foregoing (1) is the "low power mode," the information processing device 100 assumes that a difference between a maximum current value at the time of the "full power mode" and a maximum current value at the time of the "low power mode" illustrated in FIGS. 2 and 3 is an index of the processing speed and determines that the processing speed at the time of the "low power mode" is half the processing speed at the time of the "full power mode."

Here, when the waiting time of the process set using the information regarding the processing time corresponding to the "full power mode" is applied to a case in which the information processing device 100 is in the "low power mode," timeout may occur in the external device 500 despite normal communication between the external device 500 and the information processing system 1000. This is because, even when the same command is processed, a time necessary for the process in the information processing device 100 is longer in the case of the operation in the "low power mode" than in the case of the operation in the "full power mode."

Accordingly, for example, the information processing device 100 assumes that the processing speed is ½ of the processing speed at the time of the "low power mode" when "3B" is decided as the value corresponding to the operation mode in the case of the "full power mode," and decides the value "59" as the value corresponding to the operation mode using the foregoing formula 1 to cause the external device 500 to set the waiting time of the process such as "21.744 [msec](10.872 [msec]×2)."

The information processing device 100 decides the value corresponding to the operation mode determined in the process (the determination process) of the foregoing (1) and transmits the information regarding the processing time indicating the decided value to the communication control device 200 by performing, for example, the transmission control process according to the foregoing first example.

The information regarding the processing time transmitted to the communication control device 200 in the transmission control process according to the embodiment is not limited to the information regarding the processing time based on the operation mode determined in the process (the determination process) of the foregoing (1). For example, the information processing device 100 can also perform processes to be described in the following (2-2) to (2-7) in the transmission control process according to the embodiment.

(2-2) Second Example of Transmission Control Process

The information processing device 100 transmits information regarding the processing time further based on a communication speed between the information processing device 100 and the communication control device 200 in addition to the operation mode determined in the process (the determination process) of the foregoing (1), to the communication control device 200.

For example, as illustrated in FIG. 1, when the information processing device 100 and the communication control device 200 perform communication in conformity to a protocol such as HCI/SWP, a communication speed depends on a correspondence speed of the communication control device 200. The information processing device 100 can obtain information regarding the communication speed to which the communication control device 200 corresponds from the communication control device 200. As the information regarding the communication speed according to the embodiment, for example, data indicating a communication speed supported by the communication control device 200 (for example, data indicating any communication speed supported by the communication control device 200, such as 100 [kbps] or 1.6 [Mbps]) can be exemplified.

Accordingly, the information processing device 100 decides a value which is based on the operation mode determined in the process (the determination process) of the foregoing (1) and the communication speed between the information processing device 100 and the communication control device 200, for example, based on the information regarding the communication speed acquired from the communication control device 200 and transmits information regarding the processing time indicating the decided value to the communication control device 200.

Figures 12, 13:
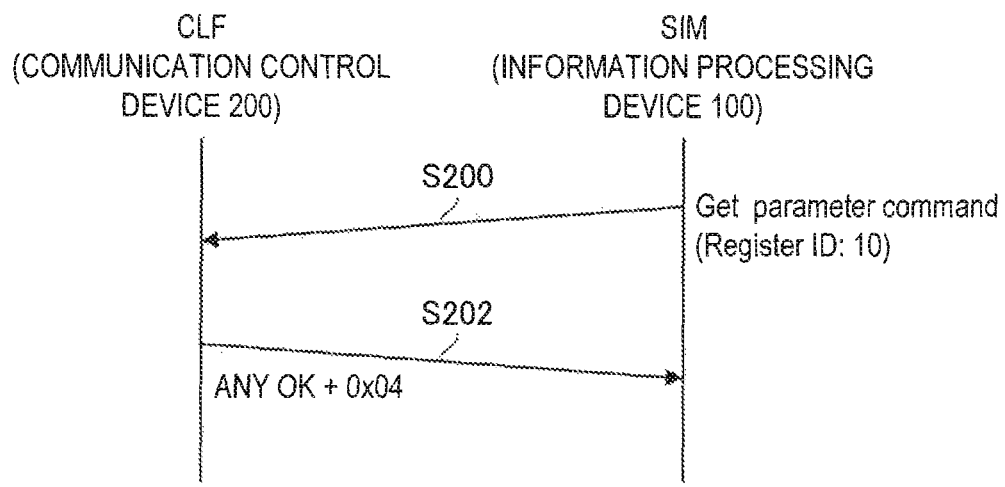
FIG. 12 is an explanatory diagram illustrating an example of a process related to an information processing method according to the embodiment.
FIG. 13 is an explanatory diagram illustrating an example of a process related to an information processing method according to the embodiment.

FIGS. 12 and 13 are explanatory diagrams illustrating an example of the process related to the information processing method according to the embodiment. FIG. 12 illustrates an example of communication related to the information regarding the communication speed and performed between the communication control device 200 and the information processing device 100. FIG. 13 illustrates an example of association of the information regarding the communication speed and values of the information regarding the processing times.

FIG. 13 illustrates an example in which the information regarding the processing time is PMm. The value of the information regarding the processing time can be calculated using, for example, the foregoing formula 1. For example, as illustrated in FIG. 13, association of the information regarding the communication speed and the value of the information regarding the processing time is performed, for example, in each operation mode which can be determined in the process (the determination process) of the foregoing (1).

The information processing device 100 transmits a transmission request to transmit the information regarding the communication speed to the communication control device 200 (S200).

The communication control device 200 receiving the transmission request transmitted from the information processing device 100 in step S200 transmits information regarding a communication speed indicating a supported communication speed to the information processing device 100 (S202). Here, as the information regarding the communication speed transmitted in step S202 by the communication control device 200, data (for example, "0x04" illustrated in FIG. 12) including communication classification illustrated in FIG. 13 can be exemplified.

The information processing device 100 acquires the information regarding the communication speed by performing communication related to, for example, the information regarding the communication speed illustrated in FIG. 12 between the communication control device 200 and the information processing device 100.

Here, the communication related to the information regarding the communication speed illustrated in FIG. 12 is performed in "Initial activation" of SWP performed, for example, between the communication control device 200 and the information processing device 100, as illustrated in FIG. 4. The communication related to the information regarding the communication speed illustrated in FIG. 12 may be different communication from "Initial activation" of SWP performed between the communication control device 200 and the information processing device 100 illustrated in FIG. 4.

For example, the information processing device 100 retains the information regarding the communication speed acquired through the communication related to the information regarding the communication speed illustrated in FIG. 12 in a recording medium. Then, for example, when the polling data is received, the information processing device 100 transmits the operation mode determined in the process (the determination process) of the foregoing (1) and the information regarding the processing time indicating the value corresponding to the information regarding the communication speed to the communication control device 200.

For example, the information processing device 100 decides a value corresponding to the operation mode which can be determined in the process (the determination process) of the foregoing (1) and the information regarding the communication speed using a table (or a database) in which a value of the information regarding the processing time is associated with the communication speed illustrated in FIG. 13 and which corresponds to the operation mode determined in the process (the determination process) of the foregoing (1). Then, the information processing device 100 transmits the information regarding the processing time indicating the decided value to the communication control device 200.

The method of deciding the value corresponding to the operation mode determined in the process (the determination process) of the foregoing (1) according to the embodiment and the information regarding the communication speed in the transmission control process according to the second example is not limited to the foregoing method.

For example, the information processing device 100 can also decide the value corresponding to the operation mode determined in the process (the determination process) of the foregoing (1) and the information regarding the communication speed by adjusting the waiting time of the process caused to be set by the external device 500 corresponding to the operation mode determined in the process (the determination process) of the foregoing (1) according to the embodiment based on the communication speed serving as a reference of the information processing device and the acquired information regarding the communication speed. Here, the waiting time of the process caused to be set by the external device 500 and corresponding to the operation mode determined in the process (the determination process) of the foregoing (1) according to the embodiment is specified using the table (or the database) in which the operation mode and the waiting time of the process are associated, as in the transmission control process according to the foregoing first example.

As a specific example, when the communication speed serving as the reference in the information processing device 100 is 212 [Kbps] and the communication speed indicated by the information regarding the acquired communication speed is 848 [Kbps], the information processing device 100 can determine that the communication speed is quadrupled.

Here, a portion that is sped up in accordance with the communication speed is a portion related to the communication rather than the entire process. Accordingly, the information processing device 100 adjusts the portion related to the communication in the waiting time of the process caused to be set by the external device 500 and corresponding to the operation mode determined in the process (the determination process) of the foregoing (1). For example, when the portion related to the process and the portion related to the communication in the waiting time of the process caused to be set by the external device 500 and corresponding to the operation mode determined in the process (the determination process) of the foregoing (1) are decided separately in advance, the information processing device 100 adjusts the portion related to the communication. For example, the information processing device 100 may adjust a time corresponding to a predetermined ratio of the waiting time of the process caused to be set by the external device 500 and corresponding to the operation mode determined in the process (the determination process) of the foregoing (1) as the portion related to the communication.

For example, when the waiting time of the process caused to be set by the external device 500 and corresponding to the operation mode determined in the process (the determination process) of the foregoing (1) is 26.58 [msec], 20 [msec] is the portion related to the process, and 6.58 [msec] is the portion related to the communication, the portion related to the communication becomes 1.645 [msec] by quadrupling the communication speed.

Accordingly, the information processing device 100 decides a value for setting the waiting time of the process caused to be set by the external device 500 to 21.645 [msec](20 [msec]+1.645 [msec]) and transmits the information regarding the processing time indicating the decided value to the communication control device 200.

For example, the information processing device 100 decides a value indicated by the information regarding the processing time as in the transmission control process according to the foregoing first example. For example, the information processing device 100 may perform calculation using the foregoing formula 1 to decide the value indicated by the information regarding the processing time by performing trial and error to reduce bits on the basis of a numerical value of the current time point.

(2-3) Third Example of Transmission Control Process

The information processing device 100 may transmit the information regarding the processing time based on an application to be executed to the communication control device 200.

The value of PMm can be changed from an applet (application) mounted on an UICC, as specified in "GP 2.2 Amendment. C v1.1," for example. More specifically, for example, the value of PMm can be changed from an applet (application) mounted on UICC using a SetInfo function of the GP regulation.

For example, when a parameter having an influence on a process of an application side is changed, the information processing device 100 decides a value corresponding to the application to be executed and transmits the information regarding the processing time indicating the decided value to the communication control device 200.

For example, the information processing device 100 may decide a value corresponding to the application to be executed and the operation mode determined in the process (the determination process) of the foregoing (1). For example, the information processing device 100 adjusts the value changed from the application using the SetInfo function or the like of the GP regulation according to the processing speed corresponding to the operation mode determined in the process (the determination process) of the foregoing (1).

Here, as a timing at which the value is decided (a timing at which the value indicated by the information regarding the processing time is changed), for example, the following timing can be exemplified:

when the same command retransmitted from the external device 500 (for example, the command retransmitted due to occurrence of timeout) is received by the application.

(2-4) Fourth Example of Transmission Control Process

The information processing device 100 transmits the information regarding the processing time which is further based on information indicating classification of the communication control device according to the embodiment in addition to the operation mode determined in the process (the determination process) of the foregoing (1) to the communication control device 200.

Here, as the information indicating the classification of the communication control device according to the embodiment, for example, data indicating a model number of the communication control device or an international mobile equipment identifier (IMEI) can be exemplified.

For example, when the information processing device 100 is configured to be detachably mounted on the information processing system 1000, a plurality of combinations of the information processing device 100 and the communication control device 200 may be present according to the information processing system 1000 on which the information processing device 100 is mounted. For example, a communication speed or the like of the communication control device 200 can be changed according to the type of communication control device 200.

Accordingly, the information processing device 100 specifies the communication control device 200 using the information indicating the classification of the communication control device and decides a value which is based on the operation mode determined in the process (the determination process) of the foregoing (1) and the specified communication control device 200. Then, the information processing device 100 transmits the information indicating the processing time indicating the decided value to the communication control device 200.

For example, the information processing device 100 performs communication with the communication control device 200 to acquire the information indicating the classification of the communication control device, as in the acquisition of the information regarding the communication speed in the process according to the foregoing second example. Here, as a timing at which the information processing device 100 acquires the information indicating the classification of the communication control device from the communication control device 200, for example, a timing at which the information processing device 100 is mounted on the information processing system 1000 and the communication is possible between the information processing device 100 and the communication control device 200 can be exemplified. The timing at which the information processing device 100 acquires the information indicating the classification of the communication control device from the communication control device 200 is not limited to the foregoing timing. For example, the information processing device 100 can acquire the information indicating the classification of the communication control device at any timing at which the information processing device 100 and the communication control device 200 can communicate.

For example, the information processing device 100 decides the value based on the operation mode determined in the process (the determination process) of the foregoing (1) and the specified communication control device 200 using a table (or a database) in which the information indicating the classification of the communication control device is associated with the value of the information regarding the processing time and which corresponds to the operation mode determined in the process (the determination process) of the foregoing (1). Then, the information processing device 100 transmits the information regarding the processing time indicating the decided value to the communication control device 200.

(2-5) Fifth Example of Transmission Control Process

The information processing device 100 transmits the information regarding the processing time which is further based on information indicating classification of the information processing device according to the embodiment in addition to the operation mode determined in the process (the determination process) of the foregoing (1) and the information indicating the classification of the communication control device according to the embodiment to the communication control device 200.

Here, as the information indicating the classification of the information processing device according to the embodiment, for example, an identification number such as an international mobile subscriber identifier (IMSI) or an IC card ID (CCID) can be exemplified.

As described above, for example, when the information processing device 100 is configured to be detachably mounted on the information processing system 1000, a plurality of combinations of the information processing device 100 and the communication control device 200 may be present according to the information processing system 1000 on which the information processing device 100 is mounted. For example, a communication speed or the like of the communication control device 200 may be changed according to the type of communication control device 200.

When a factor other than the communication speed has an influence on the waiting time according to the combination of the information processing device 100 and the communication control device 200, there is a concern that the value of the information regarding the processing time corresponding more accurately to the processing time necessary for the information processing device to perform the process may not be decided through only the communication between the information processing device 100 and the communication control device 200, as in the transmission control process according to the foregoing fourth example.

Accordingly, for example, the information processing device 100 acquires the information regarding the processing time corresponding to each operation mode from an application executed in an external device or the processing device 400 based on the information indicating the classification of the communication control device and the information indicating the classification of the information processing device and transmits the acquired information regarding the processing time to the communication control device 200. The information regarding the processing time transmitted to the communication control device 200 is transmitted to, for example, the external device 500 or the processing device 400 via the communication control device 200. For example, the information processing device 100 may directly transmit the acquired information regarding the processing time to the processing device 400 through ISO7816.

Here, as the external device according to the embodiment, for example, a server (for example, when the information processing system 1000 is a communication device such as a mobile phone or a smartphone) related to a communication company or a server (for example, when the information processing device 100 is the UICC) related to a chip vendor can be exemplified. As the application to be executed in the processing device 400 according to the embodiment, for example, an application supplied in any of the foregoing various servers can be exemplified. A user of the information processing system 1000 downloads an application from any of the foregoing servers as necessary, and installs the application, for example, by manipulating the information processing system 1000.

For example, the application to be executed in the processing device 400 acquires the information indicating the classification of the communication control device and the information indicating the classification of the information processing device from the information processing device 100 or the communication control device 200. The application to be executed in the processing device 400 delivers the information regarding the processing time corresponding to a combination of the information indicating the classification of the communication control device and the information indicating the classification of the information processing device to the information processing device 100 to update the information regarding the processing time. In the information processing device 100, the information regarding the processing time is updated by, for example, an application (for example, an applet such as an issuer security domain (ISD)) managing the performed information processing device 100 in an integrated manner or an application (for example, an applet managing PMm) managing the information regarding the processing time.

Here, when data related to the application to be executed in the processing device 400 includes a table (or a database) in which a combination of the information indicating the classification of the communication control device and the information indicating the classification of the information processing device is associated with the information regarding the processing time, the application to be executed in the processing device 400 specifies the information regarding the processing time corresponding to the combination of the information indicating the classification of the communication control device and the information indicating the classification of the information processing device using the table (or the database). Then, the application to be executed in the processing device 400 delivers the specified information regarding the processing time to the information processing device 100.

When data related to the application executed in the processing device 400 does not include the table (or the database) or the information regarding the processing time may not be specified even using the table (or the database), the application to be executed in the processing device 400 transmits the information indicating the classification of the communication control device and the information indicating the classification of the information processing device to the external device according to the embodiment. Then, the application to be executed in the processing device 400 delivers the information regarding the processing time acquired from the external apparatus according to the embodiment (the information regarding the processing time corresponding to the combination of the information indicating the classification of the communication control device and the information indicating the classification of the information processing device) to the information processing device 100.

(2-6) Sixth Example of Transmission Control Process

The information processing device 100 transmits the information regarding the processing time which is further based on presence or absence of the processing device 400 capable of performing a process in conjunction with the information processing device 100 through the communication to the communication control device 200.

Figure 14:
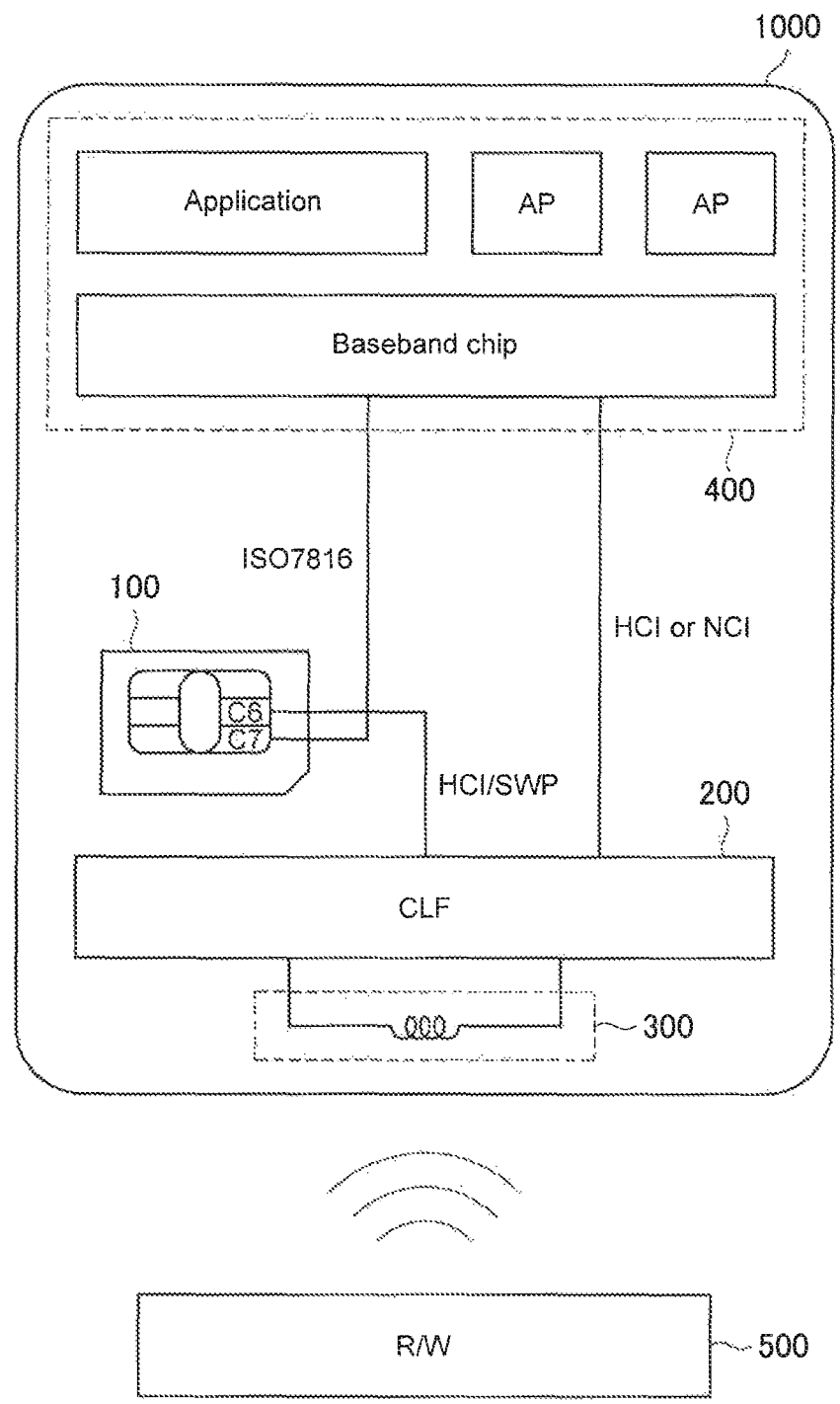
FIG. 14 is an explanatory diagram illustrating an example of a process related to an information processing method according to the embodiment.
Figure 15:
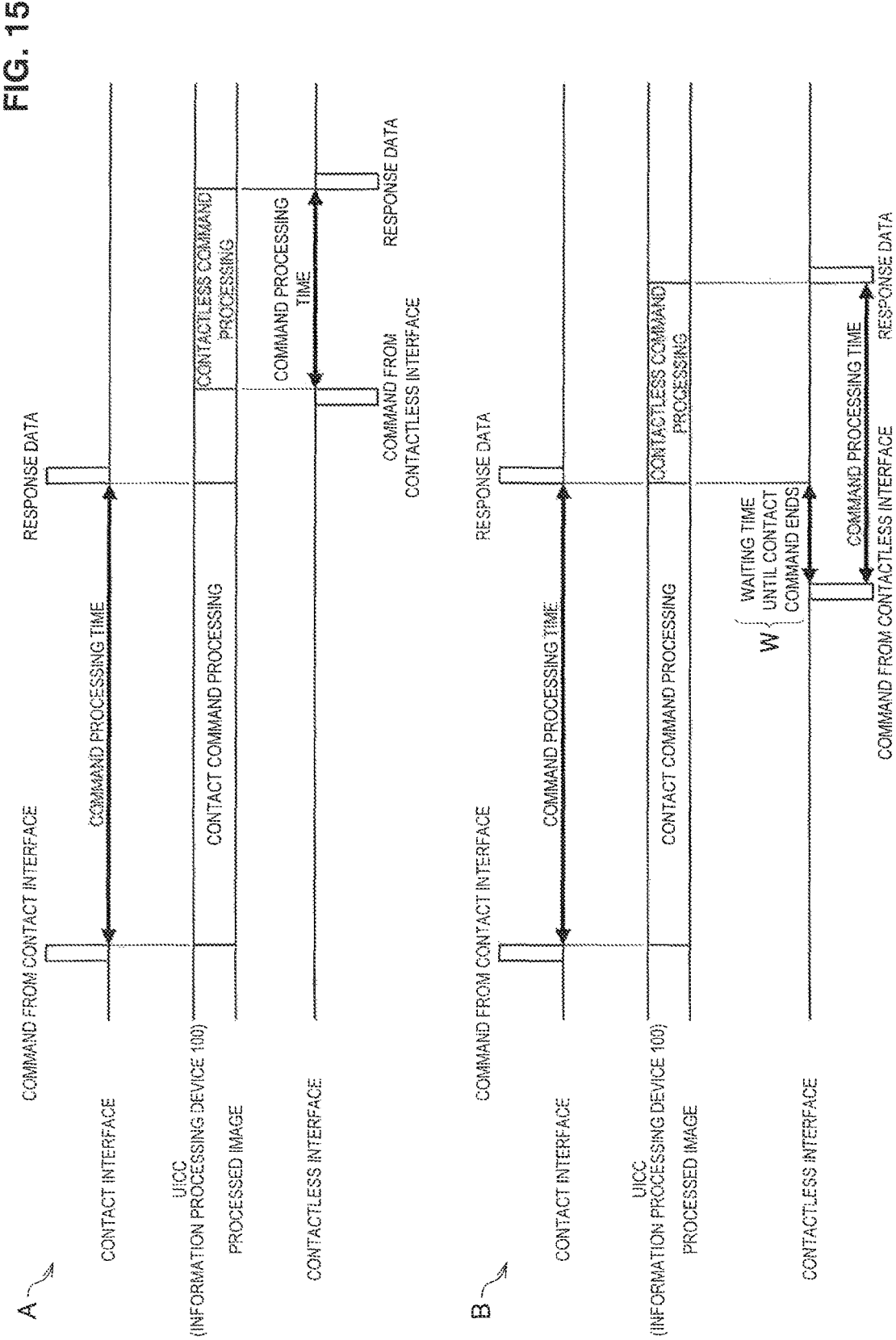
FIG. 15 is an explanatory diagram illustrating an example of a process related to an information processing method according to the embodiment.

FIGS. 14 and 15 are explanatory diagrams illustrating an example of the process related to the information processing method according to the embodiment.

FIG. 14 illustrates an example of the configuration of the information processing system 1000 illustrated in FIG. 1. It is needless to say that the neither configuration of the information processing device 100 nor the configuration of the processing device 400 included in the information processing system 1000 is limited to the example illustrated in FIG. 14.

FIG. 15 illustrates an example of a processing state between the information processing device 100 and the processing device 400 illustrated in FIG. 14. Specifically, A of FIG. 15 illustrates an example of a processing state when a command received from the communication interface (a contact interface illustrated in FIG. 15) between the information processing device 100 and the processing device 400 does not collide with a command received from a communication interface (a contactless interface illustrated in FIG. 15) between the external device 500 and the information processing device 100 via the communication control device 200. A of FIG. 15 illustrates an example of a processing state when the command received from the communication interface (the contact interface illustrated in FIG. 15) between the information processing device 100 and the processing device 400 collides with the command received from the communication interface (the contactless interface illustrated in FIG. 15) between the external device 500 and the information processing device 100 via the communication control device 200.

For example, in the example illustrated in FIG. 14, the information processing device 100 includes the following two communication interfaces:

- a base band chip of the processing device 400 or a communication interface (a communication interface corresponding to the contact interface illustrated in FIG. 15; hereinafter referred to as a "contact interface" in some cases) communicating with an application (the application or an AP illustrated FIG. 14) through ISO7816; and
- a communication interface (a communication interface corresponding to a contactless interface illustrated in FIG. 15; hereinafter referred to as a "contactless interface" in some cases) communicating with a CLF chip included in the communication control device 200 through HCI/SWP.

When a processor such as an MPU included in the information processing device 100 may not perform multitasking, processes related to the communication interfaces can be performed one by one. Specifically, for example, the processor such as an MPU included in the information processing device 100 alternately performs the processes related to the communication interfaces.

Here, as illustrated in A of FIG. 15, for example, when the process related to a contact interface is first performed and a command from a contactless interface is received after completion of the process related to the contact interface, a waiting time does not occur by the time the process related to the contactless interface starts despite the fact that the information processing device 100 can perform only a single thread.

However, as illustrated in B of FIG. 15, for example, when the process related to the contact interface is first performed and a command from the contactless interface is received, a waiting time may occur by the time the process related to the contactless interface starts due to the fact that the information processing device 100 can perform only a single thread (W illustrated in B of FIG. 15).

When the waiting time occurs by the time the process related to the contactless interface starts, as illustrated in B of FIG. 15, there is a concern of timeout occurring in the external device 500 due to the waiting time.

Accordingly, for example, when the processing device 400 is present, as illustrated in FIGS. 1 and 14, the information processing device 100 decides a value corresponding to the waiting time of the process caused to be set by the external device 500, for example, so that the waiting time which can occur by the time the process related to the contactless interface starts, as illustrated in B of FIG. 15, is included.

For example, the information processing device 100 specifies the waiting time of the process corresponding to the operation mode determined in the process (the determination process) of the foregoing (1) using a table (or a database) in which the operation mode is associated with the waiting time of the process and which is recorded in a recording medium such as the recording medium included in the information processing device 100.

The information processing device 100 adds the set waiting time to the specified waiting time of the process. Here, the set waiting time corresponds to, for example, the waiting time which can occur by the time the process related to the contactless interface starts, as illustrated in B of FIG. 15. For example, the set waiting time may be a fixed value set by a manufacturer of the information processing device 100 or may be a variable value which can be varied by the user with a user manipulation on the information processing system 1000, an application to be executed, or the like.

For example, the information processing device 100 decides a value of the information regarding the processing time to which the set waiting time is added and which corresponds to the waiting time of the process corresponding to the operation mode determined in the process (the determination process) of the foregoing (1), using the foregoing formula 1. Then, the information processing device 100 transmits the information regarding the processing time indicating the decided value to the communication control device 200.

When the process related to the contactless interface is first performed, no delay occurs in the process related to the contactless interface. When the process related to the contactless interface is first performed, a delay can occur in the process related to the contact interface. However, since a protocol notifying of a timeout time related to the processing time such as PMm in advance in regard to delay is not used on the contact interface side, no particular problem occurs.

(2-7) Seventh Example of Transmission Control Process

For example, the information processing device 100 can perform, as the transmission control process according to the embodiment, a process in which two or more processes are combined among the transmission control process according to the foregoing first example to the transmission control process according to the foregoing sixth example.

The information processing device 100 performs, for example, the process (the determination process) of the foregoing (1) and the process (the transmission control process) of the foregoing (2) as the process related to the information processing method according to the embodiment.

Here, the information processing device 100 transmits, for example, the information regarding the processing time indicating the value decided in the process (the transmission control process) of the foregoing (2), such as the information regarding the processing time based on the operation mode determined in the process (the determination process) of the foregoing (1), in the process (the transmission control process) of the foregoing (2) to the communication control device 200. The communication control device 200 transmits the information regarding the processing time to the external device 500 through contactless communication, and the external device 500 sets the waiting time of the process using the information regarding the processing time acquired through the contactless communication with the communication control device 200.

Accordingly, the information regarding the processing time corresponding to the processing time necessary for the information processing device 100 to perform the process can be supplied to the external device 500 using the information regarding the processing time for the setting of the waiting time (timeout time) of the process.

Since the information regarding the processing time corresponding to the processing time necessary for the information processing device 100 to perform the process can be supplied to the external device 500, the information processing device 100 can cause the external device 500 to set the more proper waiting time of the process corresponding to the processing time necessary for the information processing device 100 to perform the process. Since the external device 500 can set the more proper waiting time, it is possible to prevent the occurrence of the situation in which the smooth communication between the external device 500 and the information processing system 1000, as described above, is obstructed.

The process related to the information processing method according to the embodiment is not limited to the process (the determination process) of the foregoing (1) and the process (the transmission control process) of the foregoing (2).

For example, the information processing device 100 can select a processing mode and perform the process (selective process) between a first processing mode in which the process is performed using the value of fixed PMm (which is an example of the information regarding the processing time according to the embodiment) and a second processing mode in which the process is performed using the plurality of values of PMm. Here, the second processing mode according to the embodiment corresponds to a process of performing the process (the determination process) of the foregoing (1) and the process (the transmission control process) of the foregoing (2).

As a specific example, the information processing device 100 selects the processing mode between the first and second processing modes, for example, based on an attribute set in an applet (which is an example of an application) and performs the process according to the selected processing mode. Here, as an attribute of an applet, for example, an applet requesting the "full power mode" or an applet requesting the "low power mode" can be exemplified.

For example, the attribute of the applet is set in accordance with an installation parameter used to install the applet. The attribute of the applet can be changed in accordance with, for example, a user manipulation.

For example, the attribute of the applet can also be determined based on the kind of applet or the like by the information processing device 100 and can be set according to a determination result.

As an example in which the attribute of the applet is set based on the kind of applet by the information processing device 100, an example based on "the idea that necessity of the full power mode depends on a service interlocked with ON and OFF of a display in a communication device such as a mobile phone" can be exemplified. When this idea is the basis, for example, the information processing device 100 determines the attribute of the applet based on whether the applet is an applet requesting the display in the communication device such as the mobile phone to be turned on and sets the attribute of the applet.

As a specific example, the information processing device 100 determines whether the applet is an applet requesting the display in the communication device such as the mobile phone to be turned on, for example, based on a value designated as "Display Reqested Indicator" described in Non-Patent Literature 1. Here, for example, whether a screen operation in the communication device such as the mobile phone is necessary in the applet, that is, whether it is necessary for the display to be turned on, can be explicitly indicated in accordance with the value designated as "Display Reqested Indicator."

When the value designated as "Display Reqested Indicator" described in Non-Patent Literature 1 is a value indicating that the screen operation is necessary, the information processing device 100 sets the attribute of the applet, for example, further based on a state of the communication device such as the mobile phone. When the communication device such as the mobile phone is powered on in the foregoing case, the information processing device 100 sets, for example, "Applet requesting the full power mode" as the attribute of the applet. When the communication device such as the mobile phone is not powered on in the foregoing case, the information processing device 100 determines, for example, that it is not necessary to operate the applet and does not set the attribute of the applet.

Conversely, when the value designated as "Display Reqested Indicator" described in Non-Patent Literature 1 is not the value indicating that the screen operation is necessary, the information processing device 100 sets, for example, "Applet requesting the full power mode" or "Applet requesting the low power mode" as the attribute of the applet. The information processing device 100 sets the attribute of the applet based on, for example, an index other than the value designated as "Display Reqested Indicator."

It is needless to say that the example in which the attribute of the applet is set based on the kind of applet by the information processing device 100 is not limited to the foregoing examples.

For example, when "Applet requesting the full power mode" is set as the attribute of the applet, the information processing device 100 executing this applet selects the first processing mode and performs the process using the value of PMm (which is an example of the fixed PMm) for "full power mode." In the foregoing case, for example, the information processing device 100 transmits information including PMm for the "full power mode" to the external device 500. In the foregoing case, the waiting time corresponding to the value of PMm for the "full power mode" is set in the external device 500.

For example, when "Applet requesting the low power mode" is set as the attribute of the applet, the information processing device 100 executing this applet selects the second processing mode. Then, the information processing device 100 performs the process based on the plurality of values of PMm by performing the process (the determination process) of the foregoing (1) and the process (the transmission control process) of the foregoing (2).

The selection of the processing mode between the first and second processing modes in the information processing device 100 according to the embodiment is not limited to the selection performed based on the attribute set in the applet. The information processing device 100 can also selectively select the first or second processing mode, for example, based on any index capable of determining a plurality of operation modes in which processing speeds are different, such as the "full power mode" and the "low power mode."

When the processing mode is selected between the first and second processing modes and the process is performed according to the selected processing mode, if the process according to the first processing mode is performed, the information regarding the processing time corresponding to the processing time necessary for the information processing device 100 to perform the process in the first processing mode is supplied to the external device 500. When the processing mode is selected between the first and second processing modes and the process is performed according to the selected processing mode, if the process according to the second processing mode is performed, as described above, the information regarding the processing time indicating the value decided in the process (the transmission control process) of the foregoing (2) is supplied to the external device 500.

Accordingly, even when the processing mode is selected between the first and second processing modes and the process according to the selected processing mode is performed, the information processing device 100 can cause the external device 500 to set the more proper waiting time of the process corresponding to the processing time necessary for the information processing device 100 to perform the process. Even in this case, the external device 500 can set the more proper waiting time, and thus it is possible to prevent the occurrence of the situation in which the smooth communication between the external device 500 and the information processing system 1000, as described above, is obstructed.

(Information Processing Device According to Embodiment)

Next, an example of the configuration of the information processing device according to the embodiment capable of performing the process related to the information processing method according to the above-described embodiment will be described.

Figure 16:
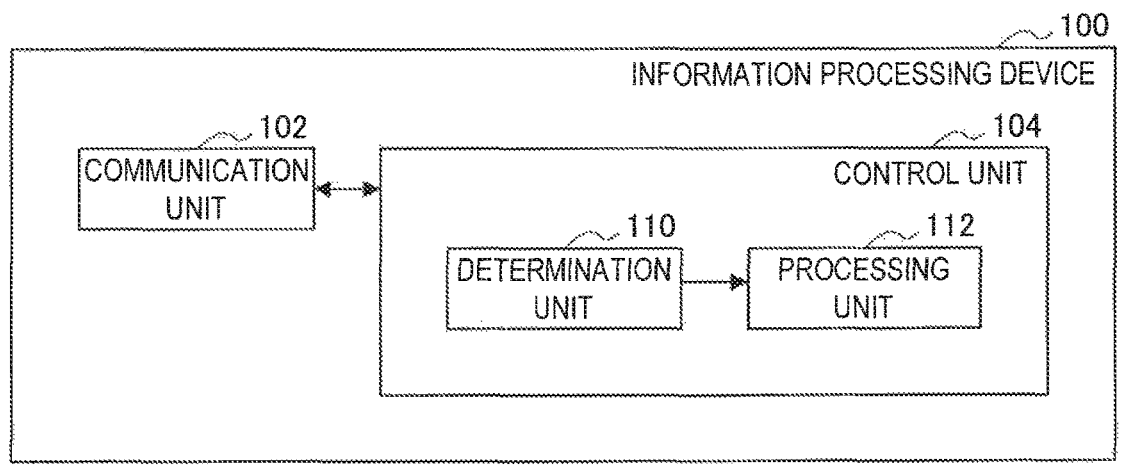
FIG. 16 is a block diagram illustrating an example of the configuration of an information processing device according to the embodiment.

FIG. 16 is a block diagram illustrating an example of the configuration of the information processing device 100 according to the embodiment. The information processing device 100 includes, for example, a communication unit 102 and a control unit 104.

The information processing device 100 may include, for example, a read-only memory (ROM) (not illustrated), a random access memory (RAM) (not illustrated), and a storage unit (not illustrated). In the information processing device 100, for example, the constituent elements are connected by a bus serving as a data transmission path.

Here, the ROM (not illustrated) stores programs used by the control unit 104 or control data such as calculation parameters. The RAM (not illustrated) temporarily stores programs executed by the control unit 104.

The storage unit (not illustrated) stores various kinds of data such as the data, the applications, or the like related to the information processing method according to the embodiment, such as the above-described various tables (or the databases). Here, as the storage unit (not illustrated), for example, a recording medium such as a nonvolatile memory, for example, a flash memory, can be exemplified. For example, the storage unit (not illustrated) may be a recording medium having a tamper-resistant property or may be detachably mounted on the information processing device 100.

[Example of Hardware and Software Configurations of Information Processing Device 100]

Figure 17:
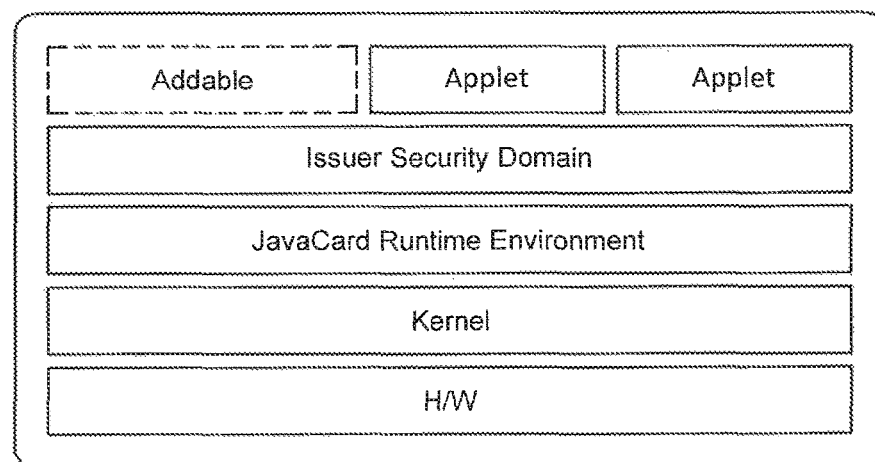
FIG. 17 is an explanatory diagram illustrating examples of hardware and software configurations of the information processing device according to the embodiment.

FIG. 17 is an explanatory diagram illustrating examples of the hardware and software configurations of the information processing device 100 according to the embodiment.

The hardware ("H/W" illustrated in FIG. 17) included in the information processing device 100 is configured to include a processor (not illustrated) including an MPU or various processing circuits, a ROM (not illustrated), a RAM (not illustrated), a recording medium (not illustrated), and a communication interface (not illustrated).

The processor (not illustrated) functions as the control unit 104 controlling the entire information processing device 100. In the information processing device 100, the processor (not illustrated) serves as, for example, a determination unit 110 and a processing unit 112 to be described below.

The communication interface (not illustrated) functions as the communication unit 102 performing communication with another constituent element, such as the communication control device 200 or the processing device 400, included in the information processing system 1000. As the communication interface (not illustrated), for example, a communication interface related to HCI and SWP or a communication interface based on the ISO7816 standard can be exemplified. The communication interface (not illustrated) may be a communication device using any scheme capable of performing communication with another constituent element included in the information processing system 1000. The information processing device 100 can include one or two or more communication interfaces (not illustrated).

As the software included in the information processing device 100, as illustrated in FIG. 17, for example, a kernel (a kernel illustrated in FIG. 17), "Java Card Runtime Environment," "Issuer Security Domain," and various applications (applets illustrated in FIG. 17) can be exemplified. An application included in the software included in the information processing device 100 can also be added as illustrated as Addable in FIG. 17.

The information processing device 100 has, for example, the configuration illustrated in FIG. 17 and performs the process related to the information processing method according to the embodiment. It is needless to say that the hardware and software configuration examples of the information processing device 100 according to the embodiment are not limited to the configuration illustrated in FIG. 17.

Referring back to FIG. 16, an example of the configuration of the information processing device 100 will be described. For example, the communication unit 102 performs communication with each of one or two or more other constituent elements, such as the communication control device 200 and the processing device 400, included in the information processing system 1000. As the communication unit 102, for example, a communication interface related to HCI and SWP or a communication interface based on the ISO7816 standard can be exemplified.

The control unit 104 is configured to include a processor such as an MPU and serves to control the entire information processing device 100. The control unit 104 includes, for example, the determination unit 110 and the processing unit 112 and serves to lead the process related to the information processing method according to the embodiment.

The determination unit 110 serves to lead the process (the determination process) of the foregoing (1) and determines one operation mode among the plurality of operation modes in which the processing speeds are different when the process is performed. More specifically, the determination unit 110 performs, for example, the determination process according to the first example described in the foregoing (1-1) and the determination process according to the second example described in the foregoing (1-2).

The processing unit 112 serves to lead the process (the transmission control process) of the foregoing (2) and transmits the information regarding the processing time, for example, based on the operation mode determined by the determination unit 110 to the communication control device 200 capable of performing the contactless communication with the external device 500 using the information regarding the processing time for the setting of the waiting time of the process.

More specifically, the processing unit 112 performs, for example, the transmission control process according to the first example described in the foregoing (2-1). The processing unit 112 may also perform, for example, the determination process according to the second example described in the foregoing (2-2) to the transmission control process according to the seventh example described in the foregoing (2-7).

The control unit 104 includes, for example, the determination unit 110 and the processing unit 112 and leads the process related to the information processing method according to the embodiment.

The information processing device 100 has, for example, the configuration illustrated in FIG. 16 and performs the processes (for example, the process (the determination process) of the foregoing (1) and the process (the transmission control process) of the foregoing (2)) related to the information processing method according to the embodiment.

Accordingly, the information processing device 100 has, for example, the configuration illustrated in FIG. 16 and can supply the information regarding the processing time corresponding to the processing time necessary for the information processing device to perform the process to the external device using the information regarding the processing time for the setting of the waiting time of the process. Accordingly, the information processing device 100 can cause the external device to flexibly set the waiting time of the process.

For example, in the configuration illustrated in FIG. 16, the information processing device 100 can obtain, for example, the advantages obtained by performing the process related to the information processing method according to the embodiment, as described above.

The configuration of the information processing device according to the embodiment is not limited to the configuration illustrated in FIG. 16.

For example, the information processing device according to the embodiment can also include one or both of the determination unit 110 and the processing unit 112 illustrated in FIG. 16 (for example, realized as an individual processing circuit) separately from the control unit 104.

The information processing device according to the embodiment may further include, for example, a processing control unit (not illustrated) that leads the selective process according to the foregoing embodiment. In the information processing device according to the embodiment, the control unit 104 may serve as the processing control unit (not illustrated) or a processing circuit separate from the control unit 104 may serve as the processing control unit (not illustrated). For example, the processing control unit (not illustrated) may perform the process related to the first processing mode and the process related to the second processing mode alone or may perform the process related to the second processing mode in cooperation with the determination unit 110 and the processing unit 112.

For example, when communication is performed with each of one or two or more other constituent elements, such as the communication control device 200 and the processing device 400, included in the information processing system 1000 via an external communication device having the same function and configuration as the communication unit 102, the communication unit 102 may not be included.

The information processing system has been described above according to the embodiment. However, the embodiment is not limited to this form. The embodiment can be applied to, for example, any device capable of performing contactless communication with an external device such as a tablet device, a communication device such as a mobile phone or a smartphone, a video or music reproduction device (or a video or music recording and reproduction device), a game device, or a computer such as a personal computer (PC).

The information processing device has been exemplified in the description as the element included in the information processing system according to the embodiment, but the embodiment is not limited to this form. The embodiment can be applied to, for example, a processing IC, such as a UICC or a SIM, which can be embedded in the information processing system according to the embodiment. In the embodiment, for example, the processing IC may be detachably mounted on the information processing system according to the embodiment.

The communication control device has been exemplified in the description as the element included in the information processing system according to the embodiment, but the embodiment is not limited to this form. The embodiment can be applied to, for example, any processing IC, such as a CLF, that can perform contactless communication with an external device via a connected antenna or an included antenna.

The processing device has been exemplified in the description as the element included in the information processing system according to the embodiment, but the embodiment is not limited to this form. The embodiment can be applied to, for example, a processing IC which is configured to include an MPU or various processing circuits and can perform various processes.

The external device using the information regarding the processing time according to the embodiment for the setting of the waiting time of the process has been exemplified according to the embodiment, but the embodiment is not limited to this form. The embodiment can be applied to, for example, any device, such as a reader and writer or a device having a function of a reader and writer, that can perform contactless communication with the information processing system according to the embodiment.

(Program According to the Embodiment)

A program (for example, a program capable of executing the process related to the information processing method according to the embodiment such as the process (the determination process) of the foregoing (1) and the process (the transmission control process) of the foregoing (2)) causing a computer to function as the information processing device according to the embodiment can be executed by a processor or the like of the computer to supply the information regarding the processing time corresponding to the processing time necessary for the information processing device according to the embodiment to perform the process to the external device using the information regarding the processing time for the setting of the waiting time of the process. Accordingly, the program causing the computer to function as the information processing device according to the embodiment can be executed by the processor or the like of the computer to cause the external device to flexibly set the waiting time of the process.

Moreover, when a program that causes a computer to function as the information processing apparatus according to the present embodiment is executed by a processor or the like in the computer, it is possible to provide an effect provided by the processing related to the information processing method according to the present embodiment described above.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it has been illustrated above that a program (computer program) that causes a computer to function as the information processing apparatus according to the present embodiment is provided, but the present embodiment can further provide a recording medium in which the above-described program is stored together.

The above-described configurations express examples of the present embodiment and, of course, pertain to the technical scope of the present disclosure.

In addition, the effects described in the present specification are merely illustrative and demonstrative, and not limitative. In other words, the technique according to the present disclosure can exhibit other effects that are evident to those skilled in the art along with or instead of the effects based on the present specification.

Additionally, the present technology may also be configured as below.

(1)

An information processing device including:

a determination unit configured to determine one operation mode among a plurality of operation modes in which processing speeds are different when a process is performed; and a processing unit configured to transmit information regarding a processing time which is based on the determined operation mode and indicates a reference of the processing time when the process is performed to a communication control device capable of performing contactless communication with an external device using the information regarding the processing time for setting of a waiting time of the process.

(2)

The information processing device according to (1), wherein the processing unit transmits information regarding the processing time which is further based on a communication speed between the information processing device and the communication control device to the communication control device.

(3)

The information processing device according to (1) or (2), wherein the processing unit transmits information regarding the processing time which is based on an application to be executed to the communication control device.

(4)

The information processing device according to any one of (1) to (3), wherein the processing unit transmits information regarding the processing time which is further based on information indicating classification of the communication control device to the communication control device.

(5)

The information processing device according to (4), wherein the processing unit transmits information regarding the processing time which is further based on information indicating classification of the information processing device to the communication control device.

(6)

The information processing device according to any one of (1) to (5), wherein the processing unit transmits information regarding the processing time which is further based on presence or absence of a processing device capable of performing the process in conjunction with the information processing device through communication to the communication control device.

(7)

The information processing device according to any one of (1) to (6), wherein the processing unit transmits one piece of the information regarding the processing time selected among a plurality of pieces of the information regarding the processing time to the communication control device.

(8)

The information processing device according to any one of (1) to (6), wherein the processing unit adjusts a value indicated by one piece of the information regarding the processing time and transmits the one piece of the information regarding the processing time indicating the adjusted value to the communication control device.

(9)

The information processing device according to any one of (1) to (8), wherein the determination unit determines the operation mode based on information indicating an operation mode acquired from the communication control device.

(10)

The information processing device according to any one of (1) to (8), wherein the determination unit determines the operation mode based on presence or absence of a power source or based on presence or absence of the power source and a state of the power source.

(11)

The information processing device according to (10), wherein the determination unit determines the operation mode set in advance to correspond to the case in which the power source is absent or the case in which the power source is present and the state of the power source is an OFF state, and wherein the determination unit determines the operation mode based on information indicating an operation mode acquired from the communication control device when the power source is present and the state of the power source is an ON state.

(12)

An information processing method performed by an information processing device, the information processing method including the steps of:

determining one operation mode among a plurality of operation modes in which processing speeds are different when a process is performed; and transmitting information regarding a processing time which is based on the determined operation mode and indicates a reference of the processing time when the process is performed to a communication control device capable of performing contactless communication with an external device using the information regarding the processing time for setting of a waiting time of the process.

(13)

An information processing system including:

an information processing device;

an antenna;

a communication control device configured to be capable of performing communication with the information processing device and capable of performing contactless communication with an external device using information regarding a processing time indicating a reference of the processing time for setting of a waiting time of a process via the antenna; and a processing device configured to be capable of performing a process in conjunction with the information processing device through communication, wherein the information processing device includes
a determination unit that determines one operation mode among a plurality of operation modes in which processing speeds are different when the process is performed, and
a processing unit that transmits information regarding the processing time which is based on the determined operation mode to the communication control device.

REFERENCE SIGNS LIST 100 information processing device
102 communication unit
104 control unit
110 determination unit
112 processing unit
200 communication control device
300 antenna
400 processing device
500 external device
1000 information processing system

The invention claimed is:

1. An information processing device comprising:
a contactless frontend configured to perform contactless communication with an external device;
a determination unit configured to determine one operation mode among a plurality of operation modes in which processing speeds are different when a process is performed by the information processing device, the operation mode being determined based on presence or absence of a power source supplying power to the information processing device, or based on or presence or absence of the power source and a state of the power source; and
a processing unit configured to transmit information regarding a processing time, which is based on the determined operation mode and indicates a reference of the processing time when the process is performed, to the contactless frontend capable of performing the contactless communication with the external device using the information regarding the processing time for setting of a waiting time of the process,
wherein the processing unit transmits information regarding the processing time, which is further based on a communication speed between the information processing device and the contactless frontend to the contactless frontend, and
wherein the determination unit and the processing unit are each implemented via at least one processor.

2. The information processing device according to claim 1,
wherein the processing unit transmits information regarding the processing time, which is based on an application to be executed to the contactless frontend.

3. The information processing device according to claim 1,
wherein the processing unit transmits information regarding the processing time, which is further based on information indicating classification of the contactless frontend to the contactless frontend.

4. The information processing device according to claim 3,
wherein the processing unit transmits information regarding the processing time, which is further based on information indicating classification of the information processing device to the contactless frontend.

5. The information processing device according to claim 1,
wherein the processing unit transmits information regarding the processing time, which is further based on presence or absence of a processing device capable of performing the process in conjunction with the information processing device through communication to the contactless frontend.

6. The information processing device according to claim 1,
wherein the processing unit transmits one piece of the information regarding the processing time selected among a plurality of pieces of the information regarding the processing time to the contactless frontend.

7. The information processing device according to claim 1,
wherein the processing unit adjusts a value indicated by one piece of the information regarding the processing time and transmits the one piece of the information regarding the processing time indicating the adjusted value to the contactless frontend.

8. The information processing device according to claim 1,
wherein the determination unit determines the operation mode based on information indicating an operation mode acquired from the contactless frontend.

9. The information processing device according to claim 1,
wherein the determination unit determines the operation mode set in advance to correspond to a case in which the power source is absent or a case in which the power source is present and a state of the power source is an OFF state, and
wherein the determination unit determines the operation mode based on information indicating an operation mode acquired from the contactless frontend when the power source is present and the state of the power source is an ON state.

10. The information processing device according to claim 1,
wherein the waiting time of the process corresponds to a processing time necessary for the information processing device to perform the process based on the information regarding the processing time.

11. The information processing device according to claim 1,
wherein, when the power source is absent, or the power source is present and the state of the power source is an OFF state, the determination unit determines the operation mode to be a first power mode,
wherein, when the power source is present and the state of the power source is an ON state, the determination unit determines the operation mode to be a second power mode, and
wherein the information regarding the processing time corresponding to the second power mode causes the external device to set the waiting time of the process to be greater than the waiting time of the process set by the external device when the information regarding the processing time corresponds to first power mode.

12. An information processing method performed by an information processing device comprising a contactless frontend, the information processing method comprising:
performing, by the contactless frontend, contactless communication with an external device;
determining one operation mode among a plurality of operation modes in which processing speeds are different when a process is performed by the information processing device, the operation mode being determined based on presence or absence of a power source supplying power to the information processing device, or based on presence or absence of the power source and a state of the power source; and transmitting information regarding a processing time, which is based on the determined operation mode and indicates a reference of the processing time when the process is performed, to the contactless frontend capable of performing contactless communication with the external device using the information regarding the processing time for setting of a waiting time of the process, wherein the processing time is further based on a communication speed between the information processing device and the contactless frontend to the contactless frontend.

13. An information processing system comprising:
an information processing device;
an antenna;
a contactless frontend configured to perform communication with the information processing device and perform contactless communication with an external device via the antenna; and
a processing device configured to perform a process in conjunction with the information processing device through communication,
wherein the information processing device includes
  a determination unit that determines one operation mode among a plurality of operation modes in which processing speeds are different when the process is performed by the information processing device, the operation mode being determined based on presence or absence of a power source supplying power to the information processing device, or based on presence or absence of the power source and a state of the power source, and
  a processing unit that transmits information regarding a processing time, which is based on the determined operation mode, to the contactless frontend capable of performing the contactless communication with the external device using the information regarding the processing time for setting of a waiting time of the process,
wherein the processing unit transmits information regarding the processing time, which is further based on a communication speed between the information processing device and the contactless frontend to the contactless frontend, and
wherein the determination unit and the processing unit are each implemented via at least one processor.

14. A non-transitory computer-readable medium having embodied thereon a program, which when executed by a computer causes the computer to execute an information processing method performed by an information processing device comprising a contactless frontend, the information processing method comprising:
performing, by the contactless frontend, contactless communication with an external device;
determining one operation mode among a plurality of operation modes in which processing speeds are different when a process is performed by the information processing device, the operation mode being determined based on presence or absence of a power source supplying power to the information processing device, or based on presence or absence of the power source and a state of the power source; and
transmitting information regarding a processing time, which is based on the determined operation mode and indicates a reference of the processing time when the process is performed, to the contactless frontend capable of performing contactless communication with the external device using the information regarding the processing time for setting of a waiting time of the process,
wherein the processing time is further based on a communication speed between the information processing device and the contactless frontend to the contactless frontend.

* * * * *